(12) United States Patent
Jones et al.

(10) Patent No.: US 8,225,371 B2
(45) Date of Patent: Jul. 17, 2012

(54) METHOD AND APPARATUS FOR CREATING AN INFORMATION SECURITY POLICY BASED ON A PRE-CONFIGURED TEMPLATE

(75) Inventors: Chris Jones, San Francisco, CA (US); Eric Bothwell, Redwood City, CA (US); Kevin T. Rowney, San Francisco, CA (US)

(73) Assignee: Symantec Corporation, Mountain View, CA (US)

( * ) Notice: Subject to any disclaimer, the term of this patent is extended or adjusted under 35 U.S.C. 154(b) by 1061 days.

(21) Appl. No.: 10/892,615

(22) Filed: Jul. 15, 2004

(65) Prior Publication Data
US 2005/0086252 A1 Apr. 21, 2005

Related U.S. Application Data

(63) Continuation-in-part of application No. 10/833,538, filed on Apr. 27, 2004, which is a continuation-in-part of application No. 10/607,718, filed on Jun. 27, 2003, which is a continuation-in-part of application No. 10/431,145, filed on May 6, 2003, which is a continuation-in-part of application No. 10/247,002, filed on Sep. 18, 2002.

(51) Int. Cl.
*G06F 17/00* (2006.01)
*G06F 17/30* (2006.01)
*H04L 29/06* (2006.01)

(52) U.S. Cl. ............... 726/1; 726/14; 726/26; 713/154; 707/999.102

(58) Field of Classification Search .................. 726/1
See application file for complete search history.

(56) References Cited

U.S. PATENT DOCUMENTS

| | | | |
|---|---|---|---|
| 4,858,152 A * | 8/1989 | Estes | 702/186 |
| 5,212,821 A | 5/1993 | Gorin et al. | |
| 5,379,391 A | 1/1995 | Belsan et al. | |
| 5,384,892 A | 1/1995 | Strong | |
| 5,577,249 A | 11/1996 | Califano | |
| 5,739,391 A | 4/1998 | Ruppel et al. | |
| 5,796,948 A | 8/1998 | Cohen | |

(Continued)

FOREIGN PATENT DOCUMENTS

CA 2 499 508 4/2004
(Continued)

OTHER PUBLICATIONS

Lymberopoulos, Leonidas. Lupu, Emil. Sloman, Morris. An Adaptive Policy Based Management Framework for Differentiated Services Networks. Third International Workshop on Policies for Distributed Systems. Pub. Date: 2002. Relevant pp. 147-158. Found on the World Wide Web at http://ieexplore.ieee.org/stamp/stamp.jsp?tp=&arnumber=1011302.*

(Continued)

*Primary Examiner* — Nathan Flynn
*Assistant Examiner* — Jeremiah Avery
(74) *Attorney, Agent, or Firm* — Lowenstein Sandler PC

(57) ABSTRACT

A method and apparatus for creating a policy based on a pre-configured template is described. In one embodiment, source data having a tabular structure is identified. Further, one of multiple policy templates is used to automatically create a policy for detecting information from any one or more rows within the tabular structure of the source data.

35 Claims, 24 Drawing Sheets

U.S. PATENT DOCUMENTS

| | | | |
|---|---|---|---|
| 5,832,212 A | 11/1998 | Cragun et al. | |
| 5,835,722 A | 11/1998 | Bradshaw et al. | |
| 5,883,588 A | 3/1999 | Okamura | |
| 5,884,033 A | 3/1999 | Duvall et al. | |
| 5,889,958 A | 3/1999 | Willens | |
| 5,892,905 A | 4/1999 | Brandt et al. | |
| 5,958,015 A | 9/1999 | Dascalu | |
| 5,960,080 A | 9/1999 | Fahlman et al. | |
| 5,996,011 A | 11/1999 | Humes | |
| 6,004,276 A | 12/1999 | Wright et al. | |
| 6,029,144 A * | 2/2000 | Barrett et al. | 705/30 |
| 6,047,283 A * | 4/2000 | Braun | 707/3 |
| 6,055,538 A | 4/2000 | Kessenich et al. | |
| 6,065,056 A | 5/2000 | Bradshaw et al. | |
| 6,073,142 A * | 6/2000 | Geiger et al. | 715/205 |
| 6,094,689 A | 7/2000 | Embry et al. | |
| 6,125,371 A | 9/2000 | Bohannon et al. | |
| 6,138,168 A * | 10/2000 | Kelly et al. | 719/310 |
| 6,233,618 B1 | 5/2001 | Shannon | |
| 6,256,631 B1 | 7/2001 | Malcolm | |
| 6,266,775 B1 | 7/2001 | Kamba | |
| 6,289,375 B1 * | 9/2001 | Knight et al. | 709/217 |
| 6,289,462 B1 | 9/2001 | McNabb et al. | |
| 6,314,190 B1 * | 11/2001 | Zimmermann | 380/282 |
| 6,318,168 B1 * | 11/2001 | Chidley et al. | 73/204.15 |
| 6,321,224 B1 | 11/2001 | Beall et al. | |
| 6,347,374 B1 * | 2/2002 | Drake et al. | 726/1 |
| 6,360,215 B1 | 3/2002 | Judd et al. | |
| 6,374,241 B1 | 4/2002 | Lamburt et al. | |
| 6,396,513 B1 | 5/2002 | Helfman et al. | |
| 6,442,607 B1 | 8/2002 | Korn et al. | |
| 6,442,686 B1 | 8/2002 | McArdle et al. | |
| 6,453,338 B1 | 9/2002 | Shiono | |
| 6,507,846 B1 | 1/2003 | Consens | |
| 6,539,430 B1 | 3/2003 | Humes | |
| 6,604,141 B1 | 8/2003 | Ventura | |
| 6,618,725 B1 | 9/2003 | Fukuda et al. | |
| 6,636,838 B1 | 10/2003 | Perlman et al. | |
| 6,639,615 B1 | 10/2003 | Majumdar | |
| 6,701,314 B1 | 3/2004 | Conover et al. | |
| 6,711,579 B2 | 3/2004 | Balakrishnan | |
| 6,714,936 B1 * | 3/2004 | Nevin, III | 707/102 |
| 6,732,087 B1 | 5/2004 | Hughes et al. | |
| 6,738,908 B1 * | 5/2004 | Bonn et al. | 726/4 |
| 6,768,986 B2 | 7/2004 | Cras et al. | |
| 6,769,032 B1 | 7/2004 | Katiyar et al. | |
| 6,778,979 B2 | 8/2004 | Grefenstette et al. | |
| 6,779,120 B1 * | 8/2004 | Valente et al. | 726/1 |
| 6,829,613 B1 | 12/2004 | Liddy | |
| 6,829,635 B1 | 12/2004 | Townsend | |
| 6,871,284 B2 * | 3/2005 | Cooper et al. | 726/1 |
| 6,941,466 B2 | 9/2005 | Mastrianni et al. | |
| 6,947,985 B2 | 9/2005 | Hegli et al. | |
| 6,965,886 B2 * | 11/2005 | Govrin et al. | 706/45 |
| 6,983,186 B2 | 1/2006 | Navani et al. | |
| 6,996,788 B2 | 2/2006 | Akiba et al. | |
| 7,003,562 B2 | 2/2006 | Mayer | |
| 7,114,185 B2 | 9/2006 | Moore et al. | |
| 7,130,885 B2 * | 10/2006 | Chandra et al. | 709/206 |
| 7,146,402 B2 | 12/2006 | Kucherawy | |
| 7,162,738 B2 | 1/2007 | Dickinson, III et al. | |
| 7,191,252 B2 | 3/2007 | Redlich et al. | |
| 7,203,749 B2 | 4/2007 | Hiraga | |
| 7,222,158 B2 | 5/2007 | Wexelblat | |
| 7,237,008 B1 | 6/2007 | Tarbotton et al. | |
| 7,249,175 B1 | 7/2007 | Donaldson | |
| 7,320,004 B1 * | 1/2008 | DeLuca et al. | 707/999.102 |
| 7,472,114 B1 | 12/2008 | Rowney et al. | |
| 7,516,492 B1 | 4/2009 | Nisbet et al. | |
| 7,523,498 B2 | 4/2009 | Fellenstein et al. | |
| 7,788,235 B1 | 8/2010 | Yeo | |
| 8,011,003 B2 | 8/2011 | Rowney et al. | |
| 2001/0027451 A1 | 10/2001 | Taguchi et al. | |
| 2001/0037324 A1 | 11/2001 | Agrawal et al. | |
| 2002/0010679 A1 | 1/2002 | Felsher | |
| 2002/0069098 A1 | 6/2002 | Schmidt | |
| 2002/0073313 A1 | 6/2002 | Brown et al. | |
| 2002/0093676 A1 | 7/2002 | Parry | |
| 2002/0120586 A1 | 8/2002 | Masaki et al. | |
| 2002/0129140 A1 | 9/2002 | Peled et al. | |
| 2002/0138579 A1 | 9/2002 | Goldberg | |
| 2002/0178228 A1 | 11/2002 | Goldberg | |
| 2002/0198766 A1 | 12/2002 | Magrino et al. | |
| 2002/0199095 A1 | 12/2002 | Bandini et al. | |
| 2003/0051026 A1 * | 3/2003 | Carter et al. | 709/224 |
| 2003/0093518 A1 | 5/2003 | Hiraga | |
| 2003/0167402 A1 | 9/2003 | Stolfo et al. | |
| 2004/0039991 A1 | 2/2004 | Hopkins et al. | |
| 2004/0193910 A1 | 9/2004 | Moles | |
| 2004/0225645 A1 | 11/2004 | Rowney et al. | |
| 2005/0027723 A1 | 2/2005 | Jones et al. | |
| 2005/0039033 A1 | 2/2005 | Meyers et al. | |
| 2005/0060537 A1 | 3/2005 | Stamos et al. | |
| 2005/0081121 A1 | 4/2005 | Wedel | |
| 2005/0138110 A1 | 6/2005 | Redlich et al. | |
| 2005/0182765 A1 | 8/2005 | Liddy | |
| 2005/0216771 A1 | 9/2005 | Malcolm | |
| 2005/0257267 A1 | 11/2005 | Williams et al. | |
| 2006/0005247 A1 | 1/2006 | Zhang et al. | |
| 2006/0143459 A1 | 6/2006 | Villaron et al. | |
| 2006/0184549 A1 | 8/2006 | Rowney et al. | |
| 2006/0224589 A1 | 10/2006 | Rowney et al. | |
| 2007/0130255 A1 | 6/2007 | Wolovitz et al. | |
| 2007/0136788 A1 | 6/2007 | Monahan et al. | |
| 2007/0156897 A1 | 7/2007 | Lim | |
| 2007/0300306 A1 | 12/2007 | Hussain | |
| 2008/0066150 A1 | 3/2008 | Lim et al. | |
| 2008/0263626 A1 | 10/2008 | Bainter et al. | |
| 2009/0013399 A1 | 1/2009 | Cottrell et al. | |
| 2009/0037594 A1 | 2/2009 | Sever et al. | |
| 2010/0169970 A1 | 7/2010 | Stolfo et al. | |
| 2010/0251363 A1 | 9/2010 | Todorovic | |
| 2010/0332481 A1 | 12/2010 | Rowney | |

FOREIGN PATENT DOCUMENTS

| | | |
|---|---|---|
| CA | 2 597 083 | 8/2006 |
| GB | 2 343 030 A | 4/2000 |
| GB | 2466367 A | 6/2010 |
| JP | 2002-189643 | 5/2002 |
| JP | 2005-539334 | 12/2005 |
| JP | 2008-8171101 | 7/2008 |
| JP | 2008-537195 | 9/2008 |
| WO | WO2004/027653 | 4/2004 |
| WO | WO2006/088952 | 8/2006 |

OTHER PUBLICATIONS

PCT Search Report PCT/US03/30178 dated Mar. 11, 2004, 5 pages.
Dale, et al., "Programming and Problem Solving with C++," 2002, Jones and Bartlett Publishers, 3rd Edition, pp. 653-662.
Deital, et al, "C++—How to Program," 2001 Prentice Hall, 3rd Edition, pp. 273-279.
Kaufman, et al., "Network Security-Private Communication in a Public World," 1995, Prentice, Hall PTR, p. 80.
Koch, et al., Oracle8—The Complete Reference, 1997, Osborn McGraw-Hill, pp. 9-7 and 51-62.
Oracle8™ Tuning, Release 8.0, Dec. 1997, Oracle®.
Alonso, Omar, et al, Oracle Secure Enterprise Search 10g, An Oracle Technical White Paper, Mar. 2006, 21 pages.
Attenex, Attenex Patterns Suite, http://www.attenex.com/products_services/attenex_patterns_suite.aspx, Downloaded Feb. 20, 2008, 2 pages.
Autonomy, Autonomy Group product overview, http://www.autonomy.com/content/products/index.en.html, Downloaded Feb. 20, 2008, 2 pages.
Autonomy, Security, http://www.autonomy.com/content/Technology/Technology_Benefits/security, Feb. 20, 2008, 2 pages.
Autonomy, Technology overview, http://www.autonomy.com/content/Technmology/index.en.html, Downloaded Feb. 20, 2008, 2 pages.
Autonomy, Limitations of Other Approaches, http://www.autonomy.com/content/Technology/Limitations_Other_Approaches, Downloaded Feb. 20, 2008, 2 pages.
Buchta, Stefan, Oracle Secure Enterprise Search Version 10.1.8.2, An Oracle Technical White Paper, Oct. 2007, 30 pages.

(Cisco) A Report From IronPort Systems, "Data Loss Prevention Best Practices—Managing Sensitive Data in the Enterprise", 2007, 21 pages.
Clearwell Systems, The Clearwell E-Discovery Platform®, http://www.clearwellsystems.com/products/e-discovery-platform, Downloaded Feb. 20, 2008 2 pages.
Clearwell Systems, The Clearwell E-Discovery Platform: Analysis, http://www.clearwellsystems.com/products/e-discovery-analysis.php, Downloaded Feb. 20, 2008, 1 page.
Clearwell Systems, The Clearwell E-Discovery Platform: Case Management, http://www.clearwellsystems.com/products/e-discovery-case-management, Downloaded Feb. 20, 2008 2 pages.
Clearwell Systems The Clearwell E-Discovery Platform: Processing, http://www.clearwellsystems.com/products/e-discovery-processing.php, Downloaded Feb. 20, 2008, 2 pages.
Clearwell Systems The Clearwell E-Discovery Platform: Review, http://www.clearwellsystems.com/products/e-discovery-review.php, Downloaded Feb. 20, 2008 2 pages.
Clearwell Systems The Clearwell E-Discovery Platform: Search &Cull-Down, http://www.clearwellsystems.com/products/e-discovery-search-cull.php, Downloaded Feb. 20, 2008 1 page.
fast, Fast ESP Revitalizing your search experience with intelligent, user-centric search, 2007, Fast Search & Transfer ASA., 6 pages.
Google, Google Search Appliance, http://www.google.com/enterprise/gsa/, Downloaded, Feb. 20, 2008, 2 pages.
Guidance Software, EnCasee® eDiscovery Suite, http://www.guidancesoftware.com/products/ediscovery_index.aspx, Downloaded Feb. 20, 2008, 2 pages.
Krishnaprasad, Muralidhar, et al, Oracle Searching Enterprise Applications (Siebel 7.8 and E-Business Suite 11i) with Oracle Secure Enterprise Search 10.1.8, An Oracle White Paper, Jan. 2007, 25 pages.
Oracle Secure Enterprise Search 10G, Mar. 2006, 8 pages.
PCT Search Report PCT /US06/5317 dated Jul. 24, 2006, 5 pages.
Zantaz, Enterprise Archive Solution (EAS) Product family, Datasheet, 4 pages.
Office Action for U.S. Appl. No. 10/247,002 mailed Mar. 3, 2006.
Office Action for U.S. Appl. No. 10/247,002 mailed Aug. 21, 2006.
Office Action for U.S. Appl. No. 10/247,002 mailed Jan. 23, 2007.
Office Action for U.S. Appl. No. 10/247,002 mailed Sep. 17, 2007.
Office Action for U.S. Appl. No. 10/247,002 mailed Dec. 12, 2007.
Notice of Allowance for U.S. Appl. No. 10/431,145 mailed Aug. 20, 2008.
Office Action for U.S. Appl. No. 10/607,718 mailed Feb. 10, 2006.
Office Action for U.S. Appl. No. 10/607,718 mailed Jun. 28, 2006.
Office Action for U.S. Appl. No. 10/607,718 mailed Nov. 15, 2006.
Office Action for U.S. Appl. No. 10/607,718 mailed Jul. 10, 2007.
Office Action for U.S. Appl. No. 10/607,718 mailed Jan. 8, 2008.
Office Action for U.S. Appl. No. 10/607,718 mailed Jul. 3, 2008.
Office Action for U.S. Appl. No. 10/833,538 mailed Oct. 31, 2006.
Office Action for U.S. Appl. No. 10/833,538 mailed Jul. 23, 2007.
Office Action for U.S. Appl. No. 10/833,538 mailed Feb. 14, 2008.
Notice of Allowance for U.S. Appl. No. 10/833,538 mailed Aug. 6, 2008.
Office Action for U.S. Appl. No. 10/892,982 mailed Jan. 23, 2007.
Office Action for U.S. Appl. No. 10/892,982 mailed Sep. 17, 2007.
Office Action for U.S. Appl. No. 10/892,982 mailed Apr. 8, 2008.
Office Action for U.S. Appl. No. 10/892,982 mailed Oct. 27, 2008.
Office Action for U.S. Appl. No. 11/057,988 mailed Aug. 18, 2008.
Office Action for U.S. Appl. No. 11/057,988 mailed Feb. 28, 2009.
Office Action for U.S. Appl. No. 11/058,551 mailed Sep. 9, 2008.
Office Action for U.S. Appl. No. 10/247,002 mailed Jun. 18, 2008.
Office Action for U.S. Appl. No. 10/247,002 mailed Nov. 25, 2008.
Office Action for U.S. Appl. No. 10/247,002 mailed May 21, 2009.
Office Action for U.S. Appl. No. 10/431,145 mailed Oct. 23, 2006.
Office Action for U.S. Appl. No. 10/431,145 mailed Jul. 26, 2007.
Office Action for U.S. Appl. No. 10/431,145 mailed Feb. 25, 2008.
Notice of Allowance for U.S. Appl. No. 10/431,145 mailed Jun. 5, 2009.
Office Action for U.S. Appl. No. 10/607,718 mailed May 1, 2009.
Office Action for U.S. Appl. No. 10/892,982 mailed Feb. 12, 2009.
Office Action for U.S. Appl. No. 10/892,982 mailed Jul. 20, 2009.
Office Action for U.S. Appl. No. 11/057,988 mailed Jul. 10, 2009.
Office Action for U.S. Appl. No. 11/058,551 mailed Mar. 20, 2009.
GB0921722.5 Search Report dated Mar. 26, 2010, 1 page.
Office Action for U.S. Appl. No. 10/247,002 mailed Dec. 31, 2009.
Office Action for U.S. Appl. No. 10/607,718 mailed Nov. 9, 2009.
Office Action for U.S. Appl. No. 10/892,982 mailed Jan. 6, 2010.
Office Action for U.S. Appl. No. 11/057,988 mailed Mar. 18, 2010.
Office Action for U.S. Appl. No. 11/058,551 mailed Sep. 11, 2009.
Office Action for U.S. Appl. No. 11/058,551 mailed Mar. 8, 2010.
Office Action for U.S. Appl. No. 10/607,718 mailed Nov. 14, 2008.
Office Action for U.S. Appl. No. 10/607,718 mailed Apr. 12, 2010.
Office Action for U.S. Appl. No. 12/490,258 mailed Mar. 31, 2011.
Office Action for U.S. Appl. No. 10/607,718 mailed Aug. 17, 2010.
Office Action for U.S. Appl. No. 10/607,718 mailed Feb. 3, 2011.
Notice of Allowance for U.S. Appl. No. 12/266,545 mailed Mar. 25, 2011.
Office Action for U.S. Appl. No. 12/982,750 mailed Apr. 11, 2011.
Office Action for U.S. Appl. No. 11/058,551 mailed Aug. 2, 2010.
Office Action for U.S. Appl. No. 11/058,551 mailed Aprl. 11, 2011.
Office Action for U.S. Appl. No. 12/079,719 mailed Jan. 21, 2011.
Office Action for U.S. Appl. No. 12/179,630 mailed Aug. 31, 2010.
Notice of Allowance Action for U.S. Appl. No. 12/179,630 mailed Mar. 24, 2011.
Office Action for U.S. Appl. No. 12/079,660 mailed Dec. 22, 2010.
Office Action for U.S. Appl. No. 12/342,038 mailed May 3, 2011.
Menezes, et al. "Handbook of Applied Cryptography", 1997, p389.
Shapiro, William, et al., "How to Manage Persistent State in DRM Systems," Available at https://www.springerlink.com/content/9h0xrubltc9abegw/fulltext.pdf, Published 2002.
White, Ron, "How Computers Work" Que Corporation, 6th Edition, 2002, pp. 12-15 and 304.
Office Action for U.S. Appl. No. 12/490,258 mailed Dec. 6, 2011.
Office Action for U.S. Appl. No. 12/632,620 mailed Dec. 7, 2011.
Office Action for U.S. Appl. No. 12/982,750 mailed Sep. 7, 2011.
Office Action for U.S. Appl. No. 12/982,750 mailed Dec. 30, 2011.
Office Action for U.S. Appl. No. 12/395,554 mailed Nov. 23, 2011.
Office Action for U.S. Appl. No. 12/410,432 mailed Jul. 29, 2011.
Office Action for U.S. Appl. No. 13/168,926, mailed Nov. 8, 2011.

* cited by examiner

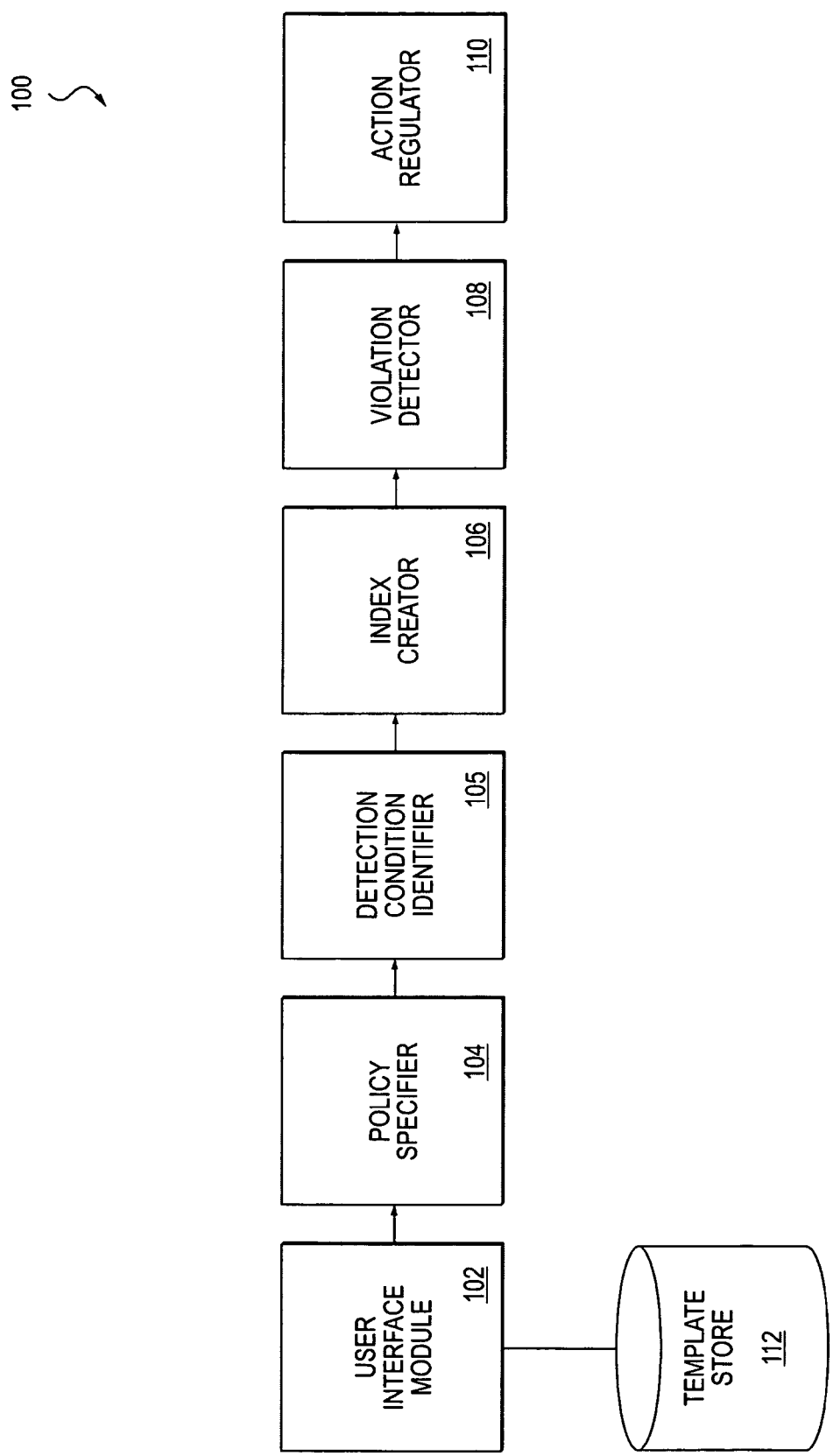

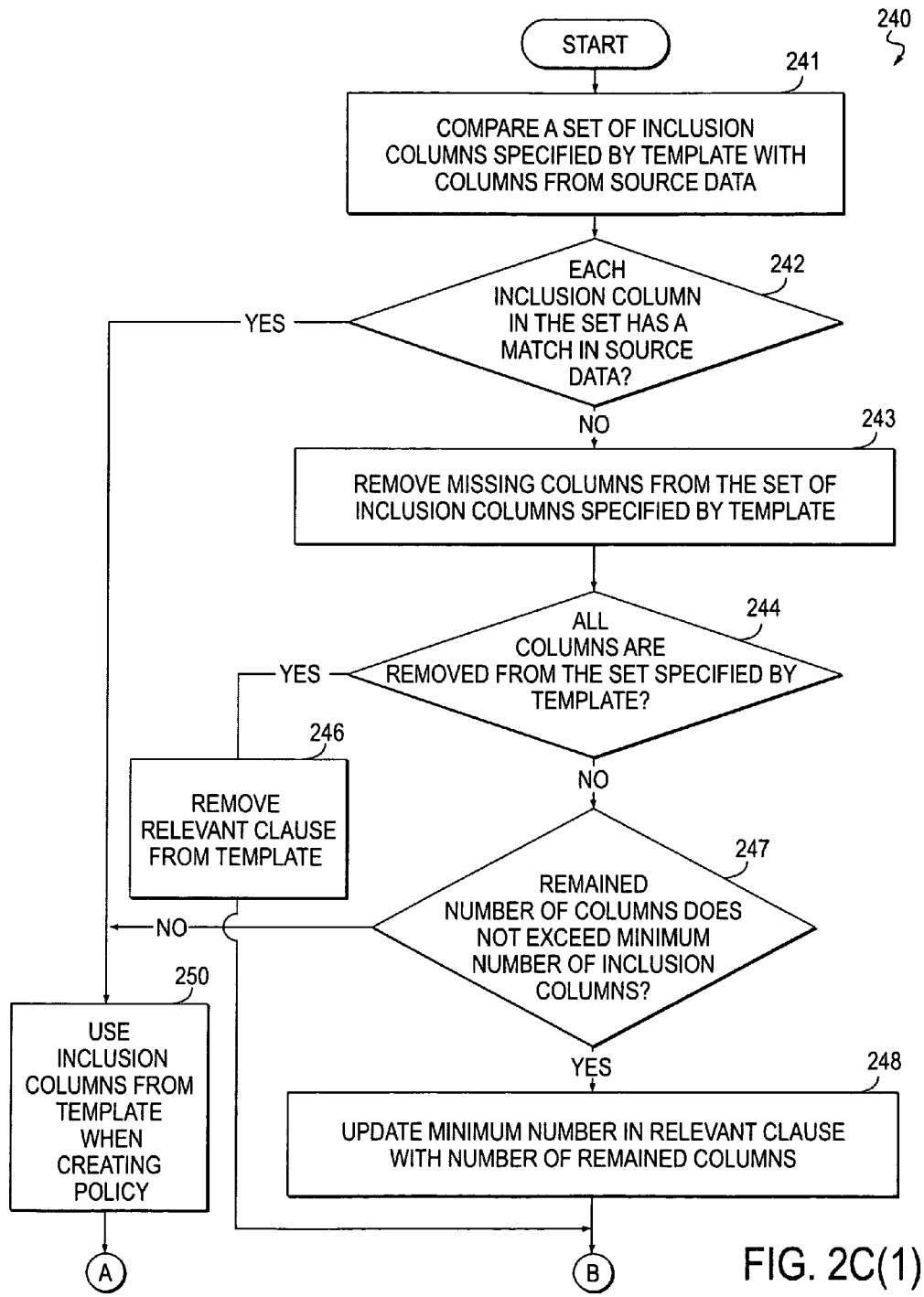
FIG. 2C(1)

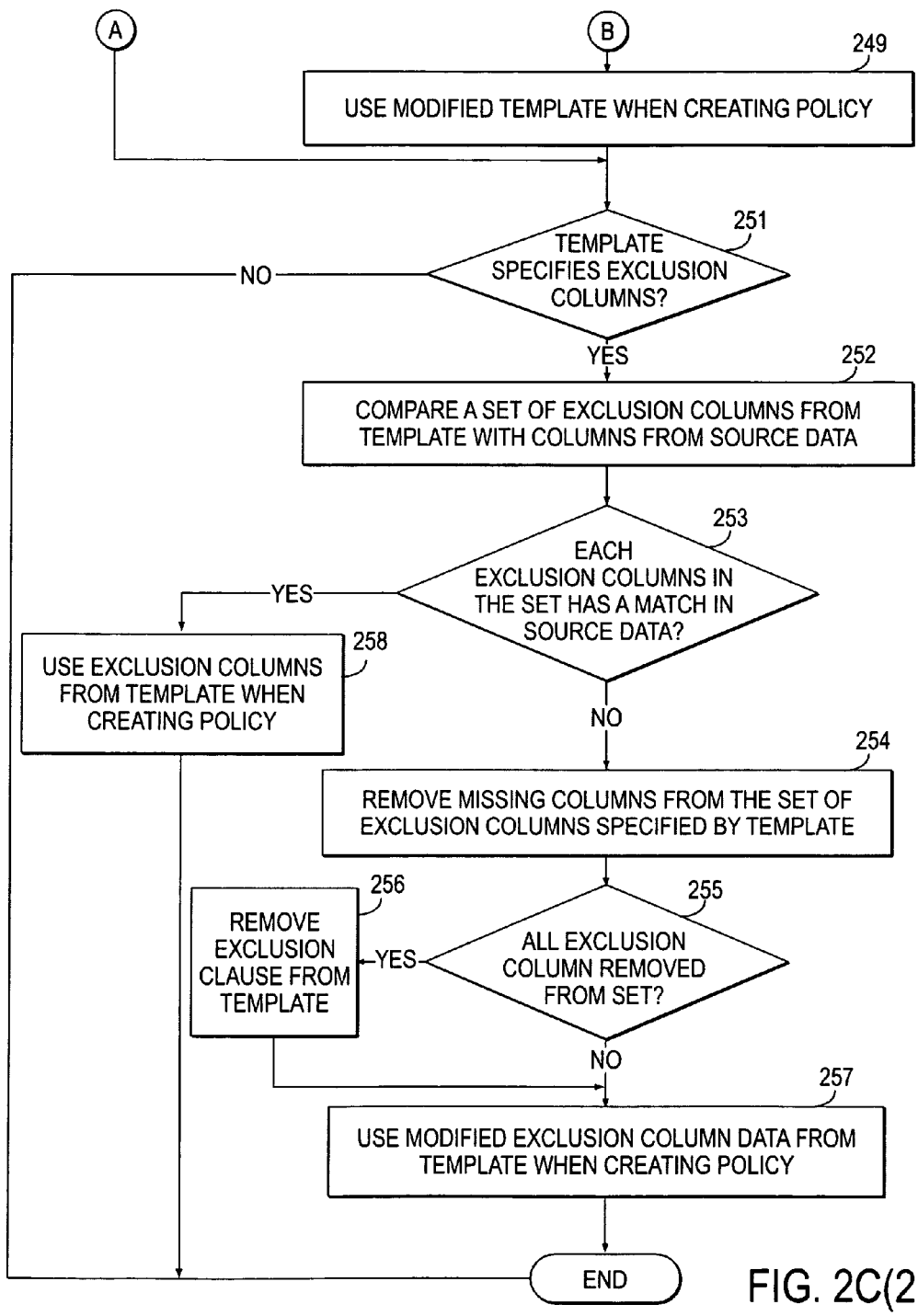
FIG. 2C(2)

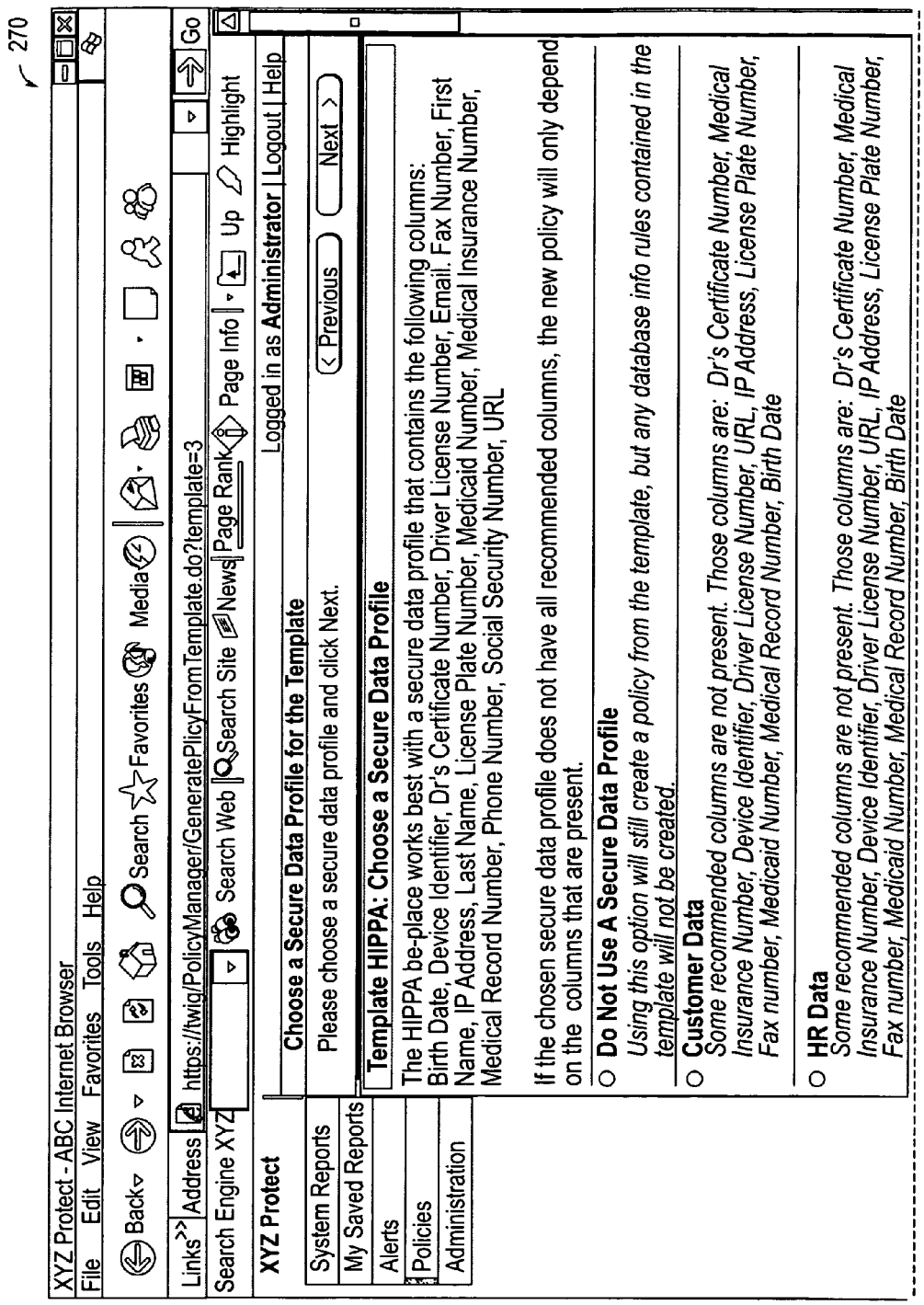
FIG. 2E(1)

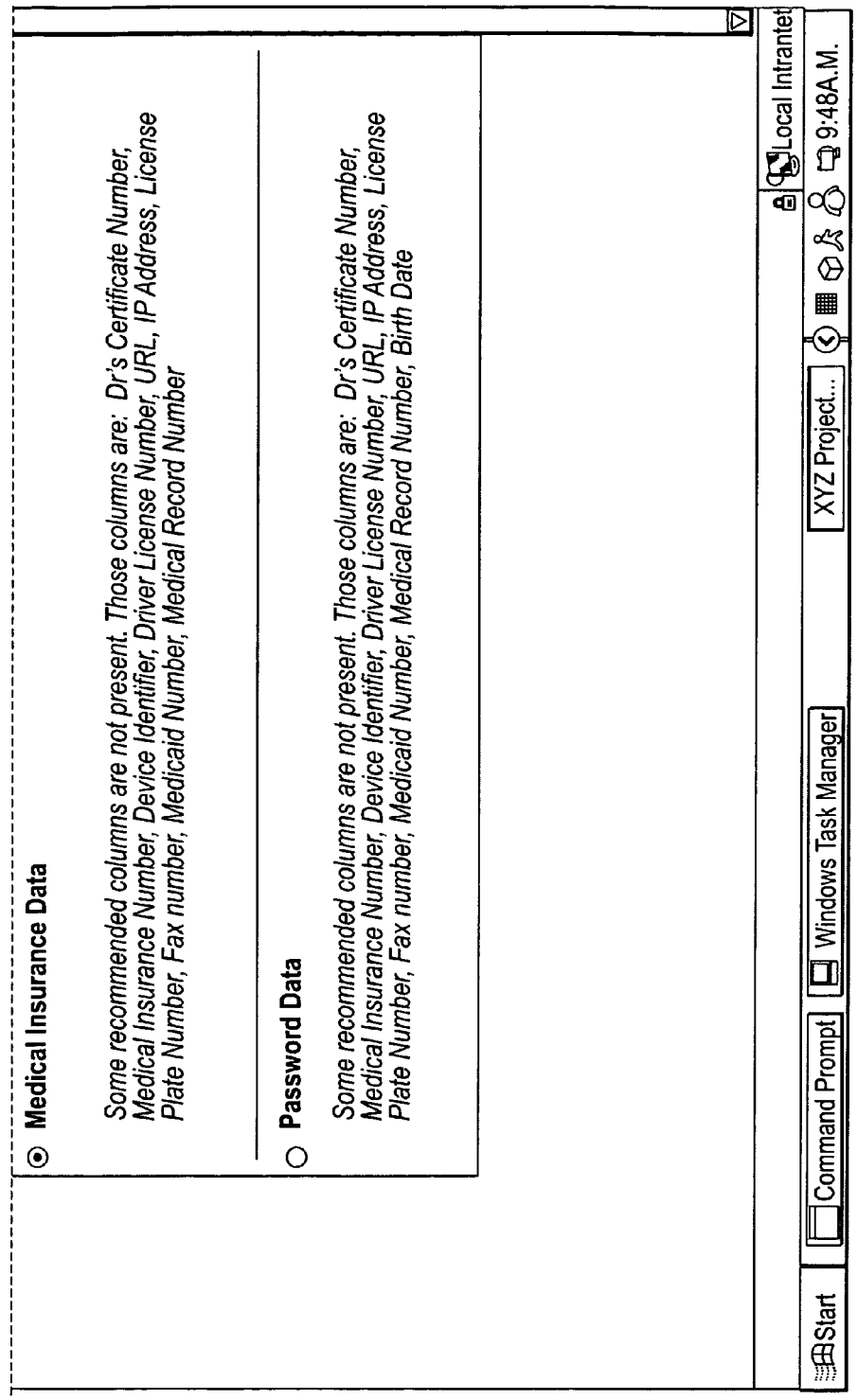
FIG. 2E(2)

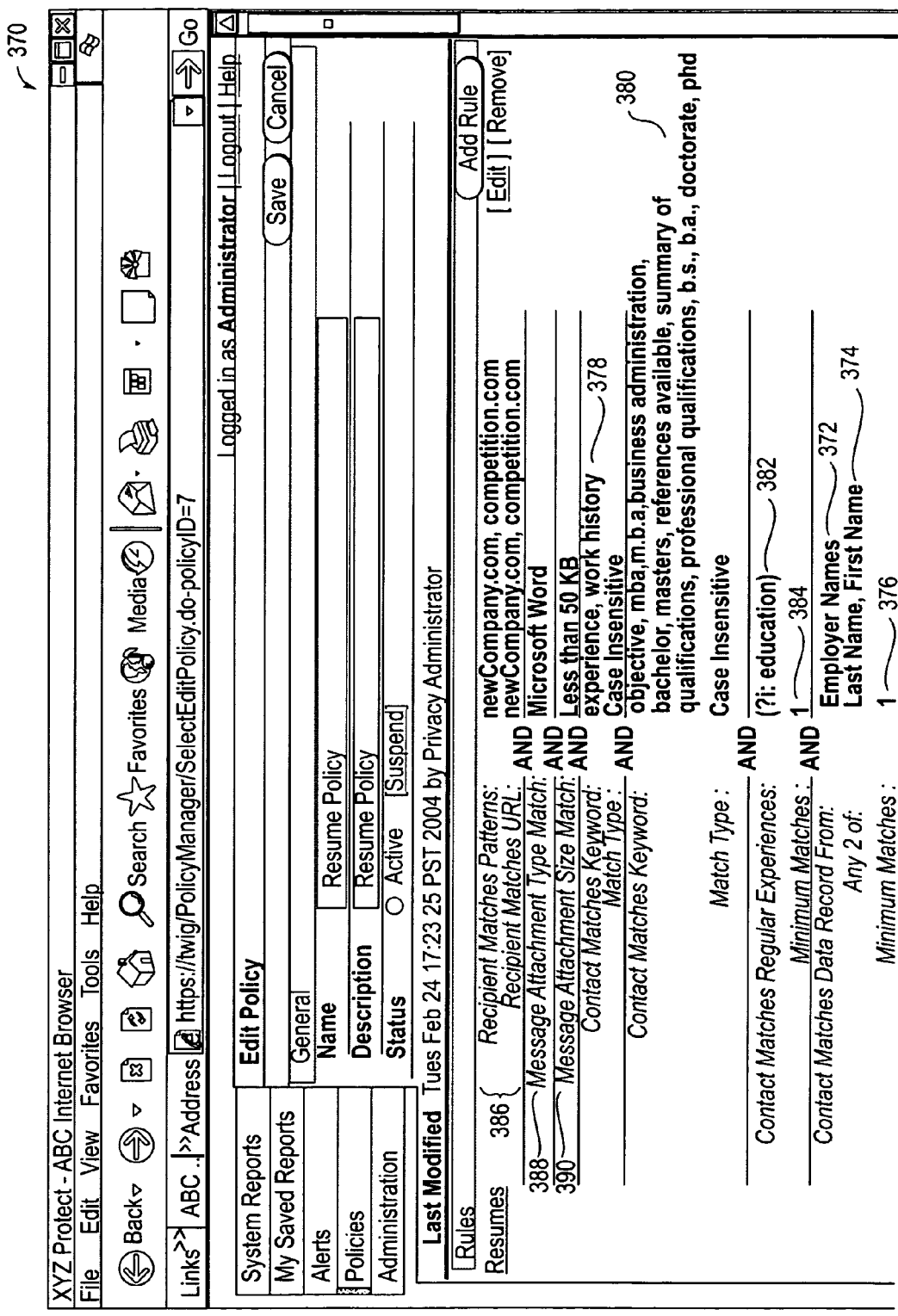
FIG. 3D(1)

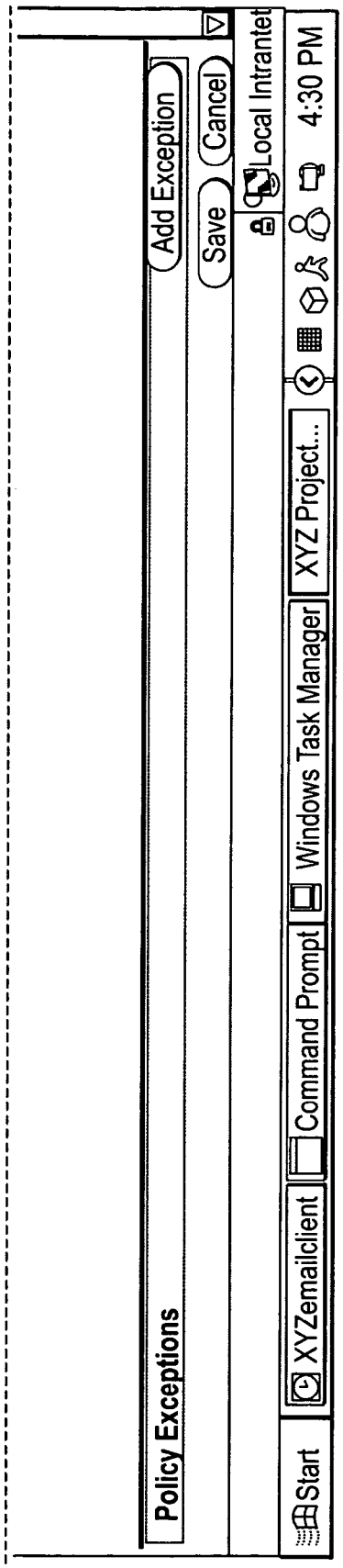
FIG. 3D(2)

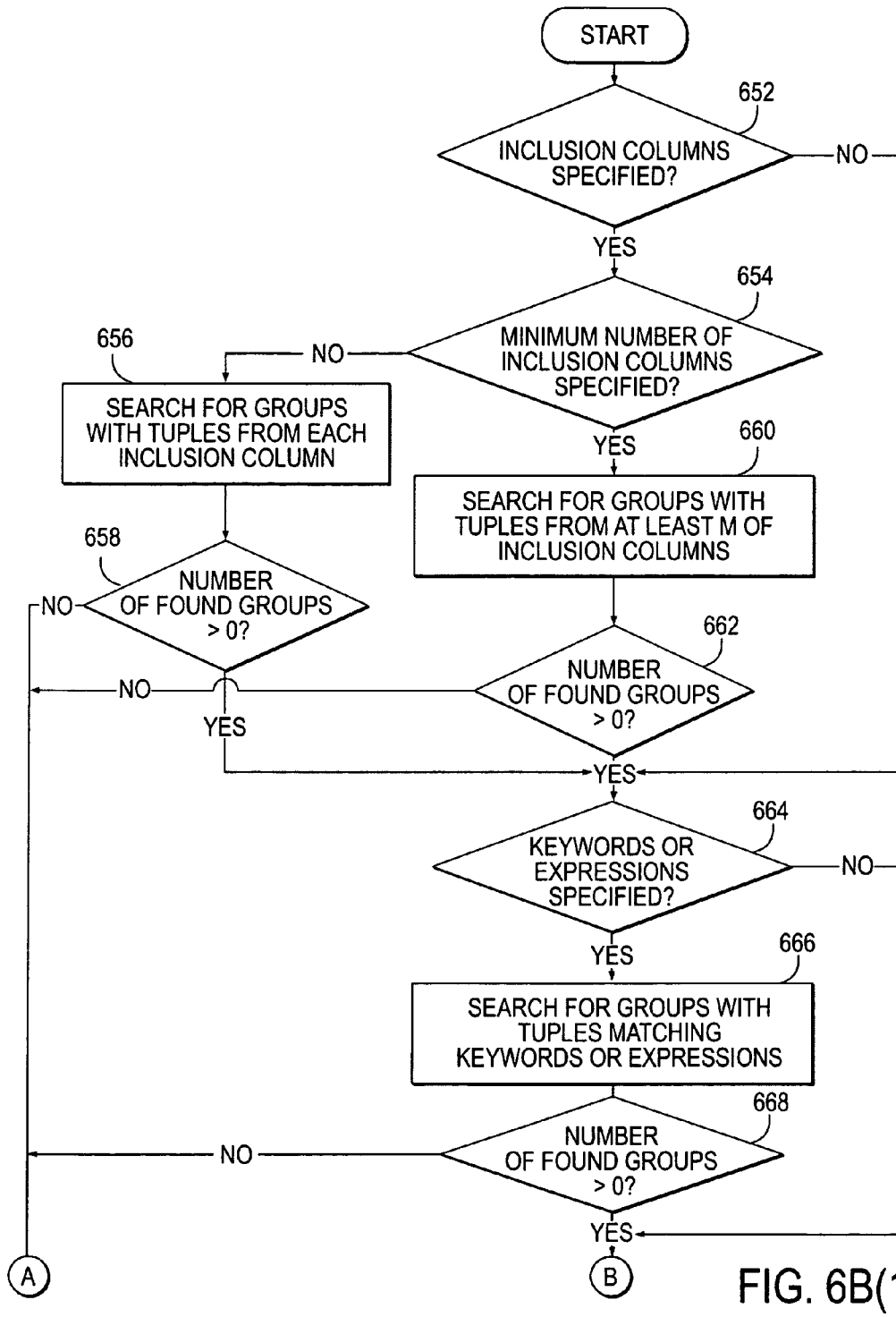
FIG. 6B(1)

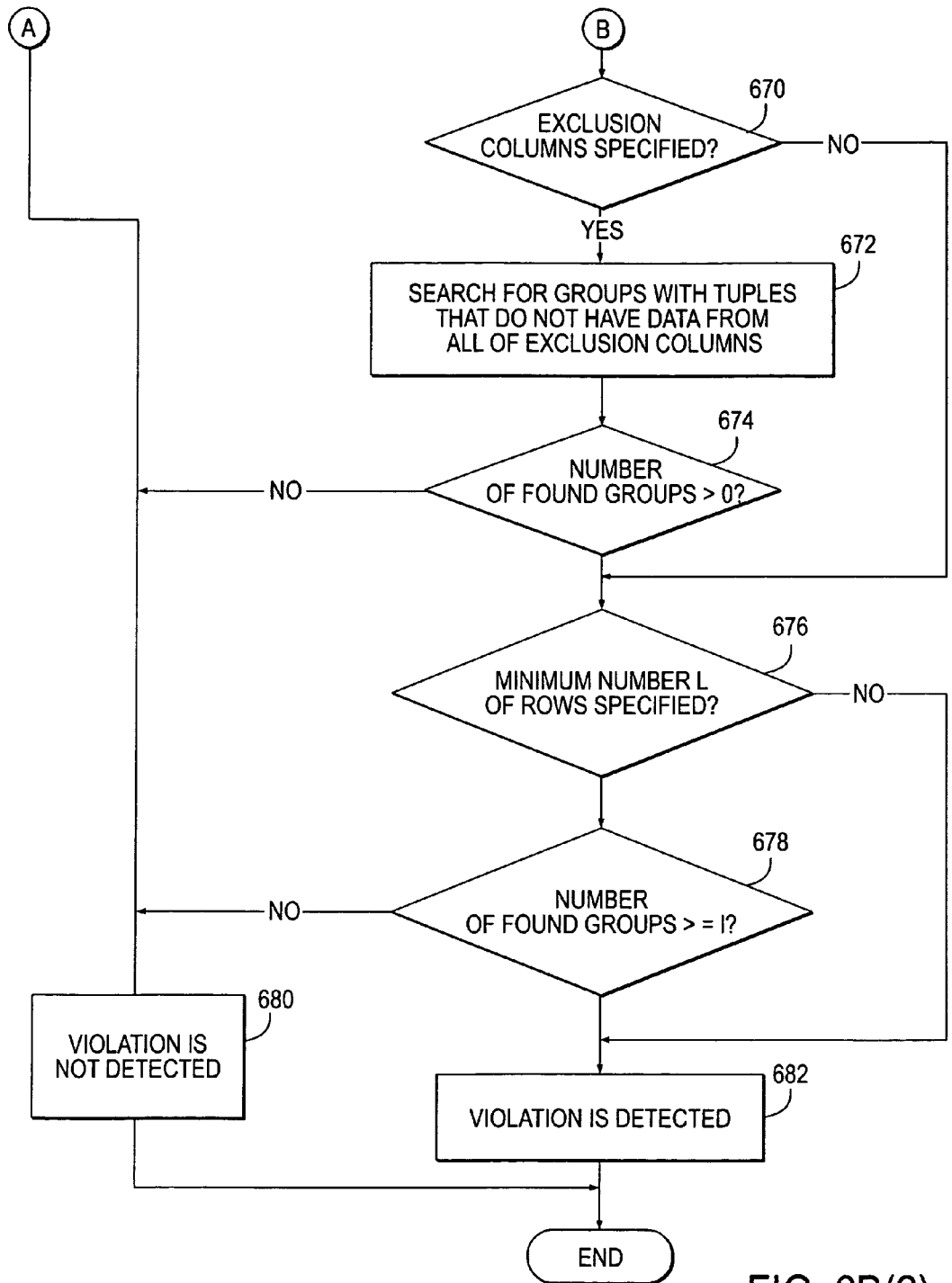
FIG. 6B(2)

METHOD AND APPARATUS FOR CREATING AN INFORMATION SECURITY POLICY BASED ON A PRE-CONFIGURED TEMPLATE

RELATED APPLICATION

This application is a continuation-in-part of U.S. patent application Ser. No. 10/833,538 filed on Apr. 27, 2004, which is a continuation-in-part of U.S. patent application Ser. No. 10/607,718 filed on Jun. 27, 2003, which is a continuation-in-part of U.S. patent application Ser. No. 10/431,145 filed on May 6, 2003, which is a continuation-in-part of U.S. patent application Ser. No. 10/247,002 filed on Sep. 18, 2002, and assigned to the assignee of the present application and hereby incorporated by reference.

FIELD OF INVENTION

The present invention relates to the field of processing data; more particularly, the present invention relates to creating an information security policy based on a pre-configured template.

BACKGROUND OF THE INVENTION

A modern organization typically maintains a data storage system to store and deliver records concerning various significant business aspects of the organization. Stored records may include data on customers (or patients), contracts, deliveries, supplies, employees, manufacturing, etc. A data storage system of an organization usually utilizes a table-based storage mechanism to store the information content. A table-based storage mechanism may include relational databases, client/server applications built on top of relational databases (e.g., Siebel, SAP, etc.), object-oriented databases, object-relational databases, document stores and file systems that store table formatted data (e.g., CSV files, Excel spreadsheet files, etc.), password systems, single-sign-on systems, etc.

Table-based storage systems typically run on a computer connected to a local area network (LAN). This computer is usually made accessible to the Internet via a firewall, router, or other packet switching device. Although the connectivity of a table-based storage system to the network provides for more efficient utilization of information maintained by the table-based storage system, it also poses security problems due to the highly sensitive nature of this information. In particular, because access to the contents of the table-based storage system is essential to the job function of many employees in the organization, there are many possible points of possible theft or accidental distribution of this information. Theft of information represents a significant business risk both in terms of the value of the intellectual property as well as the legal liabilities related to regulatory compliance.

Theft of information may occur if access control associated with the table-based storage system has failed either because it has been misconfigured or the trust in the authorized parties is misplaced. Various search mechanisms have been used to detect theft of sensitive information. The description of these search mechanisms is provided below.

Relational Database Search Techniques

Relational structures hold data in a fashion that presents naturally intuitive ways to query the data, and has the added advantage of hiding the details of the underlying disk storage system from the user. The typical applications for database systems involve the storage and retrieval of a large number of smaller pieces of data that can be naturally formatted into a table structure. Relational databases have high utility because the types of queries that most people care about can be optimized using the well-known index structures outlined below.

The queries requested of relational database systems use a naturally intuitive predicate logic called Structured Query Language (SQL) that allows the user to succinctly request the tabular data that she/he may be looking for. Database tables almost always come equipped with an index that makes queries based on SQL more efficient. These indices are stored in memory using a data structure called a B-tree. The salient characteristics of B-trees most relevant to the current discussion are as follows:

B-trees are an abstract data structure based on the binary tree;

B-trees must contain some copies of the data that they index; and

B-trees are most efficient using the query examples outlined below.

Here are a number of query examples:

Exact match queries of the form A=v, where:

A refers to the column or "attribute" of a given database table v refers to a specific attribute value e.g., SELECT * FROM CUSTOMERS WHERE Income=30,000

Range queries of the form v1<A<v2, where:

A refers to the column or "attribute" of a given database table e.g., SELECT * FROM CUSTOMERS WHERE 30<Income<40

Prefix queries of the form A MATCHES s*, where:

"s" refers to a specific string value

"s*" is a regular expression e.g., Last_Name MATCHES "Smith*".

There are a number of references to original works in the field of database systems. The first is the seminal work on relational databases by E. F. Codd., "A Relational Model of Data for Large Shared Data Banks", Communications of the ACM, 13(6): 377-387, 1970.

The second reference is one of the first published works on the "B-Tree" data structure that is the fundamental data structure that enables efficient queries of the type outlined above. See Rudolf Bayer and Edward M. McCreight, "Organization and Maintenance of Large Ordered Indices", Record of the 1970 ACM SIGFIDET Workshop on Data Description and Access, Nov. 15-16, 1970, Rice University, Houston, Tex., USA (Second Edition with an Appendix), pages 107-141, ACM, 1970.

Information Retrieval Techniques

Information retrieval is a broad field that deals with the storage and retrieval of textual data found in documents. These systems are different from those of database systems chiefly in their focus on standard documents instead of tabular data. Early examples of this system were developed as part of the SMART system at Cornell. Today, the best-known information retrieval applications are web-based search engines like Google, Inktomi, and AltaVista. The typical way to use these systems is to find a reference to a document that is part of a larger set of digital documents. The user experience for these applications usually consists of a series of queries interleaved with browsing of the results. Results of the queries are presented in order of descending relevance, and the user is able to refine the queries after further browsing. As with relational databases, the huge popularity of these systems is due to the ability of the underlying indices to deliver quick responses to the types of queries that people find most useful.

Most of these systems are based on indices that are derived from so-called "concordances" that are built up from the collection of documents indexed. These concordances contain a data structure that lists, for each word, the location of each occurrence of that word in each of the documents. Such data structures allow quick lookups of all documents that contain a particular term. For user queries that ask for all documents that contain a collection of terms, the index is structured so that it represents a large number of vectors in Euclidean vector space of high dimension. The user's list of query terms is then also re-interpreted as a vector in this space. The query is run by finding which vectors in the document space are nearest to the query vector. This last approach has a variety of different optimizations applied to it for accuracy and speed, and is called the "cosine metric".

As mentioned above, the typical user interaction with these sorts of systems is an iterative cycle of querying, browsing, refining, and back to querying again. Query results are usually large numbers of documents that are ranked in order of relevance, and the false positive rate can be very high. Here are some classic examples of queries.

Boolean queries like:
   a) all documents that contain the terms "database" and "indices"
   b) all documents that contain "database" or "indices" but not "Sybase".

Link-based queries like:
   a) all documents that are linked to by documents that contain the term "dog"
   b) the most "popular" (i.e. linked to) document that contains the word "dog".

One of the first significant implementation projects of information retrieval systems is the SMART system at Cornell. This system contains many of the essential components of information retrieval systems still in use today: C. Buckley, "Implementation of the SMART Information Retrieval System", Technical Report TR85-686, Cornell University, 1985.

The WAIS project was an early application of the massively parallel super-computer produced by Thinking Machines Inc. This is one of the first fielded information retrieval systems made available over the Internet. This primary reference source for this work is by Brewster Kahle and Art Medlar: "An Information System for Corporate Users: Wide Area Information Servers." Technical Report TMC-199 Thinking Machines, Inc., April 1991, version 3.19.

Among the many contemporary commercial vendors of Internet search services is Google. Google's real breakthrough in search accuracy is its ability to harvest data from both the text of the documents that are indexed as well as the hyper-link structure. See Sergey Brin, Lawrence Page, "The Anatomy of a Large-Scale Hypertextual Web Search Engine", http://dbpubs.stanford.edu:8090/pub/1998-8.

File Shingling Techniques

The growth of the Internet and affordable means of copying and distributing digital documents spurred research interest in technologies that can help detect illegal or inappropriate copies of documents. The primary application for this work was to detect the violation of copyright law, and to detect plagiarism. There is also significant interest in this problem as it relates to spam-email (AKA unsolicited commercial email) detection and automatic elimination. The technical term applied to describe most of these techniques is "file shingling" in which adjacent sequences of document fragments are reduced to "shingles" by hash codes, and then stored in a lookup table in the same sequence as they are found in the document.

File shingling provides a very quick way to look for similarity between two documents. In order to provide protection to a specific document (e.g., a text file) the document is shingled by hashing the document sentence-by-sentence and storing these hashed sentences in a table for quick lookup. In order to test a new document to see if it contains fragments of copyrighted content, the same hash function is applied to each fragment of the test message to see if the fragments appear in a similar order as they do in the copyrighted content. The technique is quick because the time required to lookup an individual fragment can be very fast.

The typical user interaction with a file shingling system is passive instead of active. File shingling systems are usually set up to process documents automatically and deliver the query results to a user asynchronously. A typical file shingling application might be spam prevention where a set of messages is used to create an index of restricted content that an organization does not want delivered to its email systems. In this scenario, the "query" is just the automatic processing of email messages and appropriate automatic routing.

With respect to document equivalency queries, for each test document t, find all documents d in our collection of indexed documents that have the same contents as t. For the case of spam detection, the set d could be all of the known active spam messages, and the document t could be an incoming email message.

With respect to cut-and-paste detection queries, for each test document t, find all documents d in our collection of indexed documents in which some fragment of d occurs in t. For the case of plagiarism detection, the set d could be all of the previously submitted essays for a particular class, and the document t could be a new paper written by a student who is suspected of plagiarism.

The main published research projects in file shingling are called KOALA, COPS, and SCAM. They all use variants on the basic file shingling approach described above with variants that optimize performance and accuracy. For information on KOALA, see N. Heintze, "Scalable Document Fingerprinting", Proceedings of Second USENIX Workshop on Electronic Commerce, November 1996. http://www-2.cs.cmu.edu/afs/cs/user/nch/www/koala/main.html. For information on COPS, see S. Brin, J. Davis, and H. Garcia-Molina, "Copy Detection Mechanisms for Digital Documents", Proceedings of the ACM SIGMOD Annual Conference, May 1995. For information on SCAM, see N. Shivakumar and H. Garcia-Molina, "SCAM: A Copy Detection Mechanism for Digital Documents", Proceedings of 2nd International Conference in Theory and Practice of Digital Libraries (DL'95), June 1995, http://www-db.stanford.edu/~shiva/SCAM/scamInfo.html, and also see (by N. Shivakumar and H. Garcia-Molina), "Building a Scalable and Accurate Copy Detection Mechanism", Proceedings of 1st ACM Conference on Digital Libraries (DL'96) March 1996, http://www-db.stanford.edu/pub/papers/performance.ps.

Internet Content Filtering Techniques

A variety of commercial applications, referred to as content filtering systems, implement protection measures. There are two major types of applications in this category: web site restriction/monitoring software, and email content control. In both cases, the main algorithm currently in use is pattern matching against a set of regular expressions for a set collection of text fragments that would indicate data misuse. An example might be to restrict all browsing at URLs that contain the text fragment "XXX". An example for the email content control category is stopping and blocking all email that contains the words "proprietary" and "confidential" but not the words "joke" or "kidding".

SUMMARY OF THE INVENTION

A method and apparatus for creating a policy based on a pre-configured policy template is described. In one embodiment, source data having a tabular structure is identified. Further, one of multiple policy templates is used to automatically create a policy for detecting information from any one or more rows within the tabular structure of the source data.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIG. 1 is a block diagram of one embodiment of a system for protecting sensitive data of an organization.

FIG. 2C is a flow diagram of one embodiment of a process for creating a policy using a pre-configured template.

FIGS. 2D-2F illustrate exemplary user interfaces that facilitate use of templates for creating policies.

FIGS. 3A-3D illustrate exemplary user interfaces that facilitate user input of search scope parameters, according to one embodiment of the present invention.

FIGS. 6A-6C are flow diagrams of various exemplary embodiments of a process for finding a match for a subset of content fragments in an abstract data structure derived from source data.

DETAILED DESCRIPTION OF THE PRESENT INVENTION

Figure 2A:
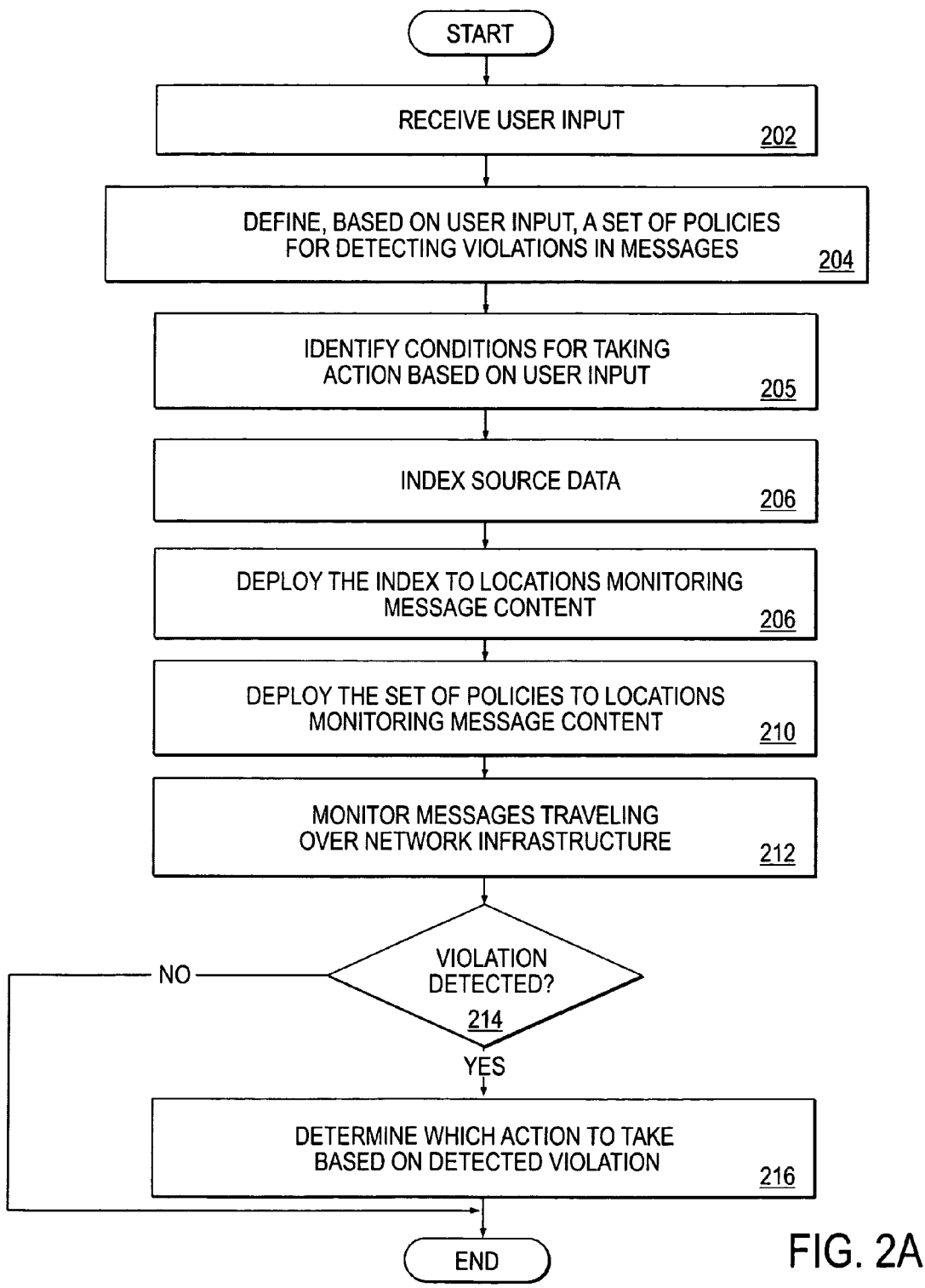
FIG. 2A is a flow diagram of one embodiment of a process for protecting sensitive data of an organization.

A method and system for creating a policy based on a pre-configured policy template is described. Source data having a tabular structure is identified. In one embodiment, the source data is identified based on user selection of the source data from a list of sources. Further, one of policy templates is used to automatically create a policy for detecting information from any one or more rows within the tabular structure of the source data. In one embodiment, the policy templates are pre-configured based on corresponding regulations concerning sensitive data maintained by an organization. In one embodiment, a list of pre-configured policy templates is presented to a user to allow the user to select a policy template for the policy being created.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

Overview

FIG. 1 is a block diagram of one embodiment of a system 100 for protecting sensitive data of an organization. The system 100 includes a user interface module 102, a policy specifier 104, an action identifier 105, an index creator 106, a violation detector 108, an action regulator 110, and a template store 112.

The template store 112 stores policy templates configured based on regulations concerning handling of sensitive information maintained by an organization. These regulations may include, for example, the Health Insurance Portability and Accountability Act (HIPAA) ensuring the confidentiality of electronic protected health information, California Senate Bill 1 (SB1) or Senate Bill 1386 (SB1386) controlling customer information leaving the company and affiliates, the Gramm-Leach-Bliley Financial Services Modernization Act controlling customer information leaving a financial institution, the Cardholder Information Security Program (CISP) controlling handling of customer credit card information maintained by an organization, etc. In one embodiment, policy templates are pre-configured based on input provided by individuals familiar with the relevant regulations, and stored on a server (not shown). When a regulation changes, a corresponding policy template is modified. In one embodiment, the system 100 periodically polls the server for new templates or updated versions of existing templates, and updates the contents of the template data store 112 based on information downloaded from the server. In one embodiment, a template includes a set of clauses (also referred to herein as rules) that specify conditions triggering a policy violation. The clauses may be composed using logical connectives of first-order logic (e.g., AND, OR, NAND, NOR, NOT, equivalent, nonequivalent, etc.).

The user interface module 102 is responsible for presenting user interfaces facilitating user input pertaining to policies. As will be discussed in more detail below, a user interface may allow a user to choose a pre-configured template and source data for a policy. Alternatively, if a user decides not to use a template, a user interface may allow the user to specify source data, and provide parameters for each rule of the policy, as well as logical connectives between the rules.

The policy specifier 104 is responsible for defining the policy based on policy parameters identified by a user. In one embodiment, the policy specifier 104 receives the policy parameters from the user interface module 102. In another embodiment, the policy specifier 104 receives the policy parameters from an Application Programming Interface (API) or via a configuration file formatted in text or a defined data format (e.g., extensible markup language (XML) or binary format).

The policy specifies which information should be present in a message to trigger a violation. In one embodiment, the policy identifies source data and specific components of the source data. The source data may be any data whose relationships allow it to be structured in a tabular format. In other words, the source data may be stored in a tabular format (e.g., data in a relational database, data maintained by client/server applications built on top of relational databases, data in document stores and file systems that store table formatted data (e.g., CSV files or Excel spreadsheet files), etc.) or it may be stored in a non-tabular format but have such relationships as to allow it to be stored in a tabular format (e.g., data stored as comma separated values in a flat file, a password database or a single-sign-on system, relational data in an object-oriented database, etc.). In one embodiment, the source data includes contents of multiple sources (e.g., multiple databases, multiple document stores, multiple file systems, multiple files, etc.). The content of each source has a tabular structure (i.e., relationships among content components allow the content to be structured in a tabular format).

In one embodiment, the policy includes a rule indicating that a violation will be triggered if the message includes fragments matching information from specific columns within any single row of the source data. In addition, the policy may include rules specifying other requirements with respect to message fragments that match information from the source data.

In some embodiments, the policy includes rules that are applicable to the characteristics of the entire message (e.g., a rule requiring that a sender and/or a recipient of the message satisfy a specific pattern, a rule requiring that the message be carried using a specific protocol, a rule requiring that a destination of the message posted for public discussion match a specific newsgroup name, etc.). In other embodiments, the policy includes rules that are applicable to the characteristics of message sub-components (e.g., a rule requiring that a message attachment be of a specific type or size, or have a specific file attachment name). In yet other embodiments, the policy includes rules requiring that the message contain a specific keyword(s) or an expression matching a specific regular expression pattern.

The action identifier 105 is responsible for defining which actions (e.g., reporting violations, intercepting and blocking messages containing detected violations, re-routing messages containing detected violations, etc.) should be taken when a certain type of violation is detected. In one embodiment, the action identifier 105 provides a user interface facilitating the user input of action conditions. In other embodiments, the action identifier 104 receives action conditions as parameters supplied by an Application Programming Interface (API) or via a configuration file formatted in text or a defined data format (e.g., XML or binary format).

In one embodiment, a single user interface is used to facilitate user input of policy parameters and user input of action conditions.

The index creator 106 is responsible for creating an index for the source data defined by the policy specifier 104. In one embodiment, in which the source data includes contents of multiple sources, an index is created for the content of each source. In one embodiment, the created index contains no copies of the database data, or contains only encrypted or hashed copies of database data. Such an index may be created using a tuple-storage mechanism that provides a data structure for storing multiple tuples associated with fragments of the database data. Examples of the tuple-storage mechanism include a hash table, a vector, an array, a tree, a list, or a table in a relational database management system. As will be described in more detail below, the data stored in the indices only retains the relative placement of the elements in the database in relation to other elements. For example, in the case of a hash table, the index may store, for each fragment of the database data (e.g., a data fragment inside a database cell), the fragment's hash code together with its row number and column number.

The violation detector 108 is responsible for receiving policies from the policy specifier 104, receiving search indexes from the index creator 106, and monitoring messages to detect violations of the abovementioned policies. The violation detector 108 may be responsible for monitoring messages sent over the network (e.g., email messages, messages posted on the Internet for public discussion, etc.), as well as data processed by personal computing devices, and data stored on data storage media of personal computing devices such as portable computers, desktop computers, Personal Digital Assistants, cell-phones, etc. The information content being monitored may contain free-form text that is not associated with any known tabular structure. In one embodiment, multiple violation detectors 108 are implemented at different locations to provide scalability and/or protect multiple possible points of egress of information.

The action regulator 110 is responsible for evaluating detected violations, determining which actions to perform for each detected violation based on the action conditions, and performing the identified actions. In one embodiment, multiple action regulators 110 are implemented at different locations, along with corresponding violation detectors 108.

In one embodiment, the system 100 consists of two components: a policy management system (PMS) and a data monitoring system (DMS). The PMS is responsible for defining policies and detection conditions, creating an index for each source data specified by the policies, and sending the policies and detection conditions, together with the source data index, to the DMS. The DMS is responsible for monitoring messages based on the information received from the PMS and performing appropriate actions when policy violations are detected. In one embodiment, the PMS and the DMS are coupled to a computer network that communicates any of the standard protocols for the exchange of information. In one embodiment, the two subsystems (PMS and DMS) run on one Local Area Network (LAN). However, the PMS and DMS may be incorporated into the same physical or logical system. In another embodiment, the PMS and DMS may not necessarily reside on the same LAN. The PMS may reside on the same LAN as the data source, but the DMS may reside on a different LAN that is separated from the LAN on which PMS resides. In this configuration, the two distinct LANs may ultimately be coupled together via the Internet but separated by firewalls, routers, and/or other network devices. This is an advantageous configuration for the case where a company wants to restrict another company that needs their database data (such as a law firm or marketing agency) from violating the first company's database data policy.

In another embodiment, the system 100 is directed to monitoring information content residing on a personal computing device of a user to detect user operations that may involve a potential misuse of data (e.g., saving or accessing restricted source data on any storage device on the computing system, using restricted source data in an application, printing restricted source data, using restricted source data in any network communication protocol, etc.). In this configuration, the PMS component of the system 100 may reside on a server and the DMS component of the system 100 may reside on a device coupled to the server via a public network (e.g., the Internet) or a private network (e.g., LAN).

FIG. 2A is a flow diagram of one embodiment of a process 200 for protecting sensitive data of an organization. The process is performed by processing logic that may comprise hardware (circuitry, dedicated logic, etc.), software (such as is run on a general purpose computer system or a dedicated machine), or a combination of both.

Processing logic begins by receiving user input pertaining to a policy (processing block 202). As will be discussed in more detail below, the user input may specify source data that contains sensitive information and a pre-configured policy template to be used for the policy. Alternatively, the user input may specify source data and rule parameters for the policy, such as parameters concerning the source data (e.g., specific columns of the source data, the minimum number of columns of the source data, the minimum number of rows of the source data, etc.). In one embodiment, the source data includes contents of multiple sources (e.g., multiple databases, multiple document stores, multiple file systems, multiple files, etc.), with the content of each source having a tabular structure.

The user input may also specify characteristics of the message (e.g., a sender or recipient identifier pattern, a protocol to carry messages, a destination of the message posted for public discussion (e.g., a specific newsgroup name), etc.), or certain characteristics of a message sub-component (e.g., a message attachment type or size, a file attachment name, etc.). In addition, the user input may specify keywords or a regular expression pattern.

At processing block 204, processing logic defines the policy based on the user input pertaining to the policy.

At processing block 205, processing logic identifies action conditions specifying which action should be taken when a certain violation is detected. In one embodiment, the action conditions are identified based on user input. Alternatively, the action conditions are pre-programmed (e.g., requiring that each violation triggered by the presence of information from the source data in a message be reported to a certain user).

At processing block 206, processing logic creates the index (or multiple indexes) of the source data.

Next, processing logic deploys the index (processing block 208) and the policy to each location at which content monitoring takes place (processing block 210). In one embodiment, processing logic also deploys action conditions to each location at which content monitoring is occurring.

Subsequently, at processing block 212, processing logic monitors content traveling over network infrastructure or residing on the user's personal computer.

Upon detecting a policy violation (processing block 214), processing logic determines which action should be taken in response to the detected violation (processing block 216). For example, processing logic may decide, based on action conditions, to report a violation, to intercept and block the content violating the policy, to re-route the content violating the policy, etc.

Policy Definition

Figure 2B:
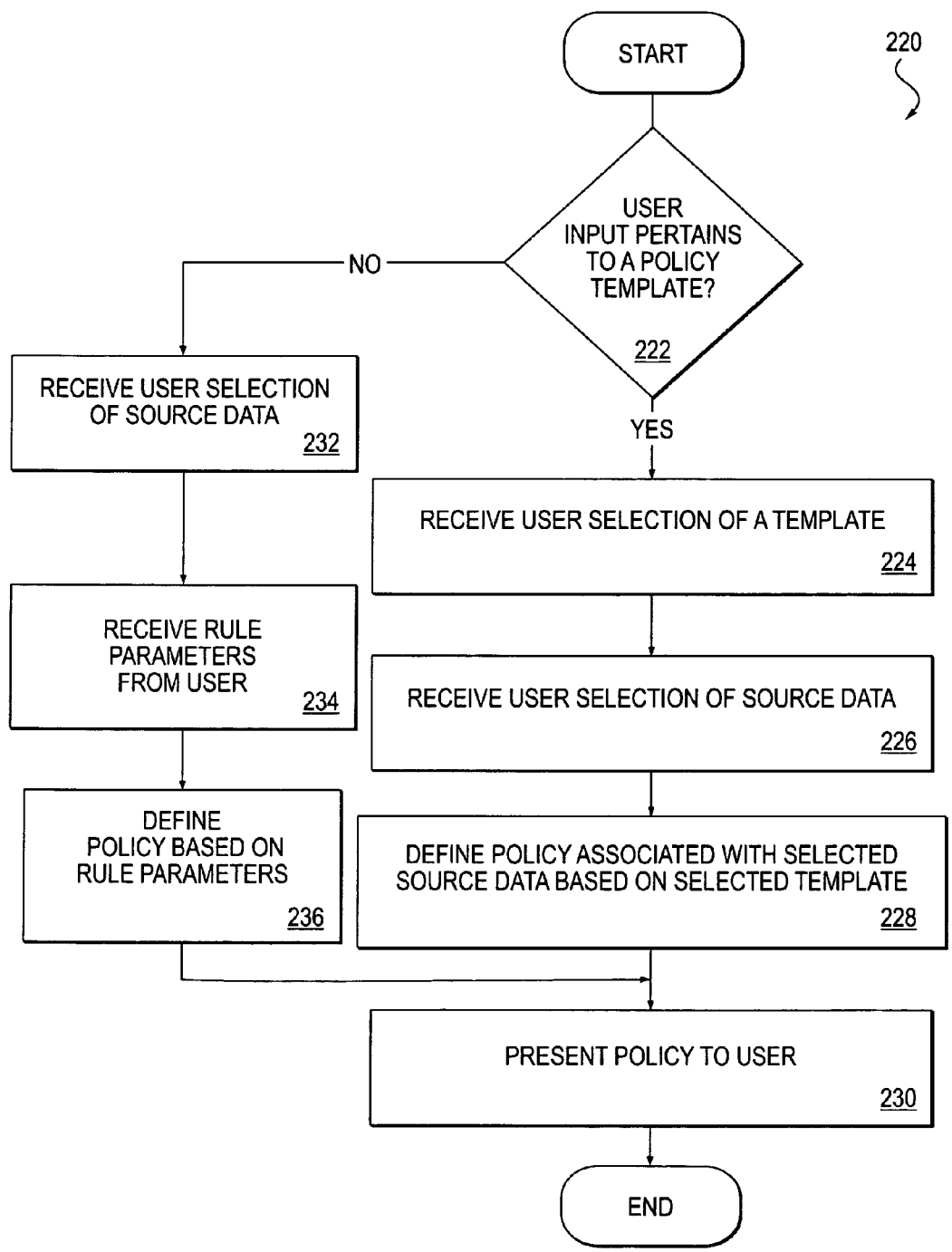
FIG. 2B is a flow diagram of one embodiment of a process for defining a policy.

FIG. 2B is a flow diagram of one embodiment of a process 220 for defining a policy. The process is performed by processing logic that may comprise hardware (circuitry, dedicated logic, etc.), software (such as is run on a general purpose computer system or a dedicated machine), or a combination of both.

Processing logic begins with determining whether a policy template should be determination based on user input (e.g., provided via a user interface) specifying whether the policy should be defined using a pre-configured policy template. Alternatively, processing logic makes this determination automatically. For example, processing logic may decide whether a policy template should be used based on the user's characteristics (e.g., the user name, the user position within the organization, etc.) or some other information.

If the determination made at processing box 222 is positive, processing logic selects a pre-configured template for the policy (processing block 224). In one embodiment, the selection is made based on user input specifying the template (e.g., by selecting a template from a list of templates displayed to the user). Alternatively, the selection is made automatically based on the type of organization associated with the user (e.g., selecting an HIPAA template if a user is an employee at a hospital) or some other information.

As discussed above, pre-configured templates correspond to regulations concerning handling of sensitive information maintained by an organization. These regulations may include, for example, the HIPAA, SB1, SB1386, the Gramm-Leach-Bliley Act, the CISP, etc. In one embodiment, policy templates are pre-configured based on input provided by individuals familiar with the relevant regulations.

In one embodiment, a template includes a set of clauses composed using logical connectives of first-order logic. In one embodiment, a template includes a clause specifying which information from the source data should be present in a message to trigger a violation. For example, a clause may indicate that a violation will be triggered if the message contains matching information from specific columns (inclusion columns) within any single row of the source data. A clause may also indicate a minimum number of these inclusion columns and/or a minimum number of matches found in the message. As will be discussed in more detail below, each match includes a collection of tokens from the message that match information from a single row of the source data. In addition, a clause may specify exclusion columns (i.e., columns whose data should not be present in the found match). In one embodiment, inclusion and/or exclusion columns are from different data sources selected for the policy.

In another embodiment, a template includes a clause specifying conditions applicable to the characteristics of the entire message. For example, a clause may indicate that a violation will be triggered if a sender and/or a recipient of the message satisfies a specific pattern, the message is carried using a specific protocol, or a destination of the message posted for public discussion match a specific newsgroup name.

In yet another embodiment, a template includes a clause specifying conditions applicable to the characteristics of a specific message sub-component (e.g., an attachment). For example, a clause may indicate that a violation will be triggered if a message sub-component is of a specific type or size, or has a specific file name.

In still another embodiment, a template includes a clause indicating that a violation will be triggered if the message contains a specific keyword(s) or an expression matching a specific regular expression pattern.

In yet another embodiment, a template includes a combination of two or more of the abovementioned clauses.

At processing block 226, processing logic selects source data for the policy. In one embodiment, the selection is made based on user input specifying the source data (e.g., a user selection from a list of sources). Alternatively, the selection is made automatically based on specific characteristics associated with the user or the organization of the user. In one embodiment, each-data source in the list has been preprocessed (e.g., source column names were mapped to column names used in a template). In one embodiment, the selected source data includes contents of multiple sources (e.g., as specified by the user's selection of multiple sources from the list).

At processing block 228, processing logic creates a policy for the selected source data based on the selected template.

If the determination made at processing box 222 is negative (i.e., templates should not be used for creating a policy), processing logic identifies the source data based on user input (processing block 232), receives policy parameters specified by the user for the policy rules (processing block 234), and creates a policy for the source data using the specified policy parameters (processing block 236).

Afterwards, at processing block 230, processing logic presents the policy to the user. The user may then request to add a new rule to the policy, or remove or modify any existing rule of the policy.

FIG. 2C is a flow diagram of one embodiment of a process 240 for creating a policy using a pre-configured template. The process is performed by processing logic that may comprise hardware (circuitry, dedicated logic, etc.), software (such as is run on a general purpose computer system or a dedicated machine), or a combination of both.

Processing logic begins with comparing a set of inclusion columns from source data that are specified by a relevant template (e.g., a template selected by the user) (processing block 241). If each inclusion column in the set specified by the template has a matching column in the source data (processing box 242), processing logic creates a policy based on the original template (processing block 250). As discussed above, in one embodiment, the inclusion columns in the set are from multiple sources (e.g., multiple databases, multiple document stores, multiple file systems, multiple files, etc.), with the content of each source having a tabular structure.

If any inclusion column from the set specified by the template does not have a matching column in the source data (processing box 242), processing logic removes each inclusion column that does not have a matching column in the source data from the set specified by the template (processing block 243).

If processing logic determines that all columns have been removed from the set specified by the template (processing box 244), processing logic removes the relevant clause from the template (processing block 246) and uses the modified template when creating a policy (processing block 249).

If processing logic determines that some columns still remain in the set specified by the template (processing box 244), processing logic further determines whether the number of remaining columns is below the minimum number of inclusion columns that is specified in the template (processing block 247). If not, processing logic creates a policy based on the original template (processing block 249). If so, in one embodiment, processing logic updates the minimum number of inclusion columns in the clause of the template with the number of remaining columns (processing block 248) and uses the template so modified to create the policy (processing block 249).

In another embodiment, if the number of remaining columns is below the minimum number of inclusion columns that is specified in the template, processing logic removes the relevant clause from the template and creates a policy based on the remaining clauses of the template.

Further, processing logic determines whether the template selected by the user specifies exclusion columns (processing box 251). If so, processing logic compares a set of exclusion columns that are specified by the template with the columns in the source data (processing block 252). If each exclusion column in the set specified by the template has a matching column in the source data (processing box 253), processing logic uses exclusion column data from the original template when creating the policy (processing block 258). If any exclusion column from the set specified by the template does not have a matching column in the source data (processing box 253), processing logic removes each exclusion column that does not have a matching column in the source data from the set specified by the template (processing block 254).

If processing logic determines that all exclusion columns have been removed from the set specified by the template (processing box 255), processing logic removes the exclusion clause from the template (processing block 256) and creates a policy based on the modified template (processing block 257).

If processing logic determines that some columns still remain in the set specified by the template (processing box 255), processing logic uses the remaining exclusion columns when creating the policy (processing logic 257).

Figure 2D:
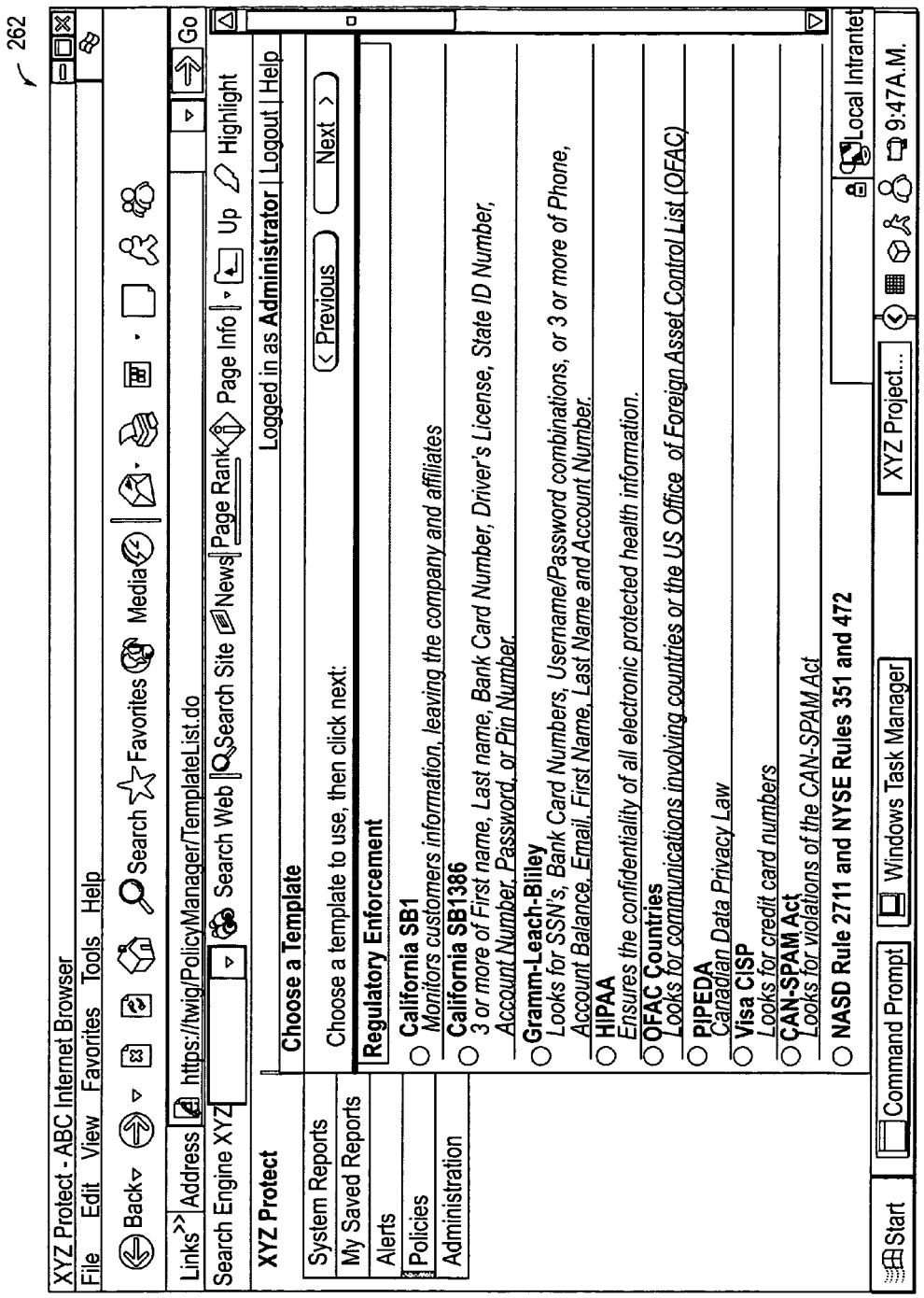
Figure 2F:
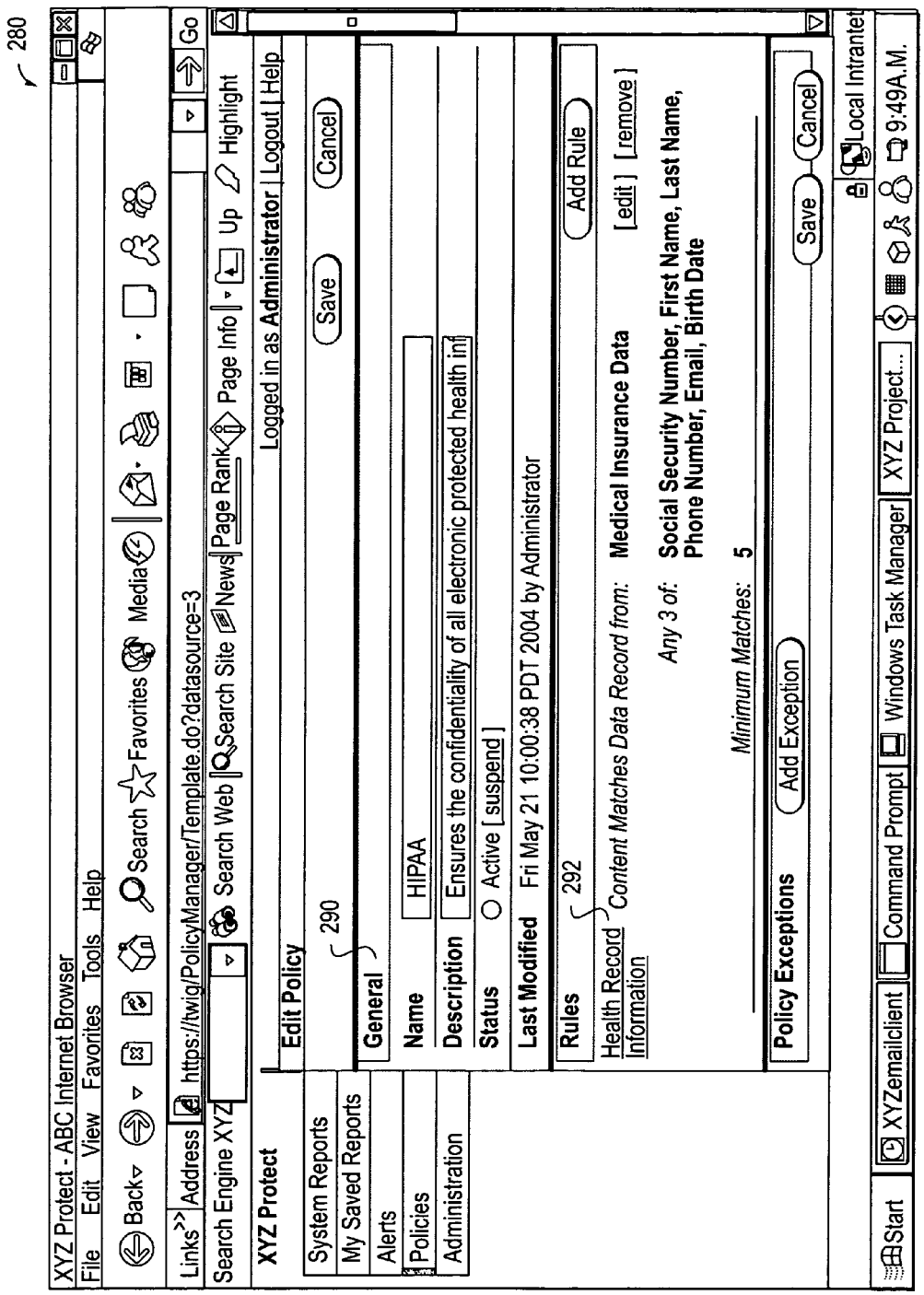

FIGS. 2D-2F illustrate exemplary user interfaces that facilitate use of templates for creating policies.

Referring to FIG. 2D, a user interface 262 presents a list of pre-configured templates and allows a user to select a template from the list.

Referring to FIG. 2E, a user interface 270 presents a list of data sources and allows a user to select one or more data source from the list. The list of data sources includes data sources that were preprocessed (e.g., columns of a data source were mapped to columns of the template). For each preprocessed data source, the user interface 270 specifies which columns recommended by the template are not present in the data source. In addition, the user interface 270 allows the user to choose a data source that has not been preprocessed.

Referring to FIG. 2F, a user interface 280 displays parameters of the created policy, including general information 290 about the policy (e.g., the policy's name, description, status, and date of the latest modification) and parameters of its rule 292. The user can edit or remove the rule or add a new rule.

As discussed above, templates may not be used to create a policy. Rather, the policy may be created based on user input specifying various parameters for policy rules. These policy parameters may identify the source data and specify columns in the source data. In one embodiment, the columns are specified to request that the matches returned by the search include information from any single row of the source data and that the information from the single row include data from each of the specified columns.

In one embodiment, the policy parameters specify a value for a particular column. This column value is specified to request that the matches returned by the search include information from any single row of the source data, that the information from the single row include data from the particular column, and that this data be equal to the specified value.

In one embodiment, the policy parameters provide a minimum number of columns, in addition to the specified columns from the source data. The minimum number of columns is provided to request that the matches returned by the search include information from any single row of the source data and that the information from the single row include data from at least this number of the specified columns.

In one embodiment, the policy parameters specify exclusion columns. The exclusion columns are specified to request that the matches returned by the search include information from any single row of the source data and that the information from the single row exclude data from any of the specified exclusion columns.

In one embodiment, the policy parameters specify a minimum number of rows to request that the matches returned by the search include information from at least this number of random rows of the source data.

In one embodiment, the user input pertaining to the policy parameters is facilitated via a user interface. FIGS. 3A-3D illustrate exemplary user interfaces that facilitate user input of policy parameters, according to one embodiment of the present invention. The policy parameters shown herein are arbitrary and modifiable in various areas of the user interfaces.

Figure 3A:
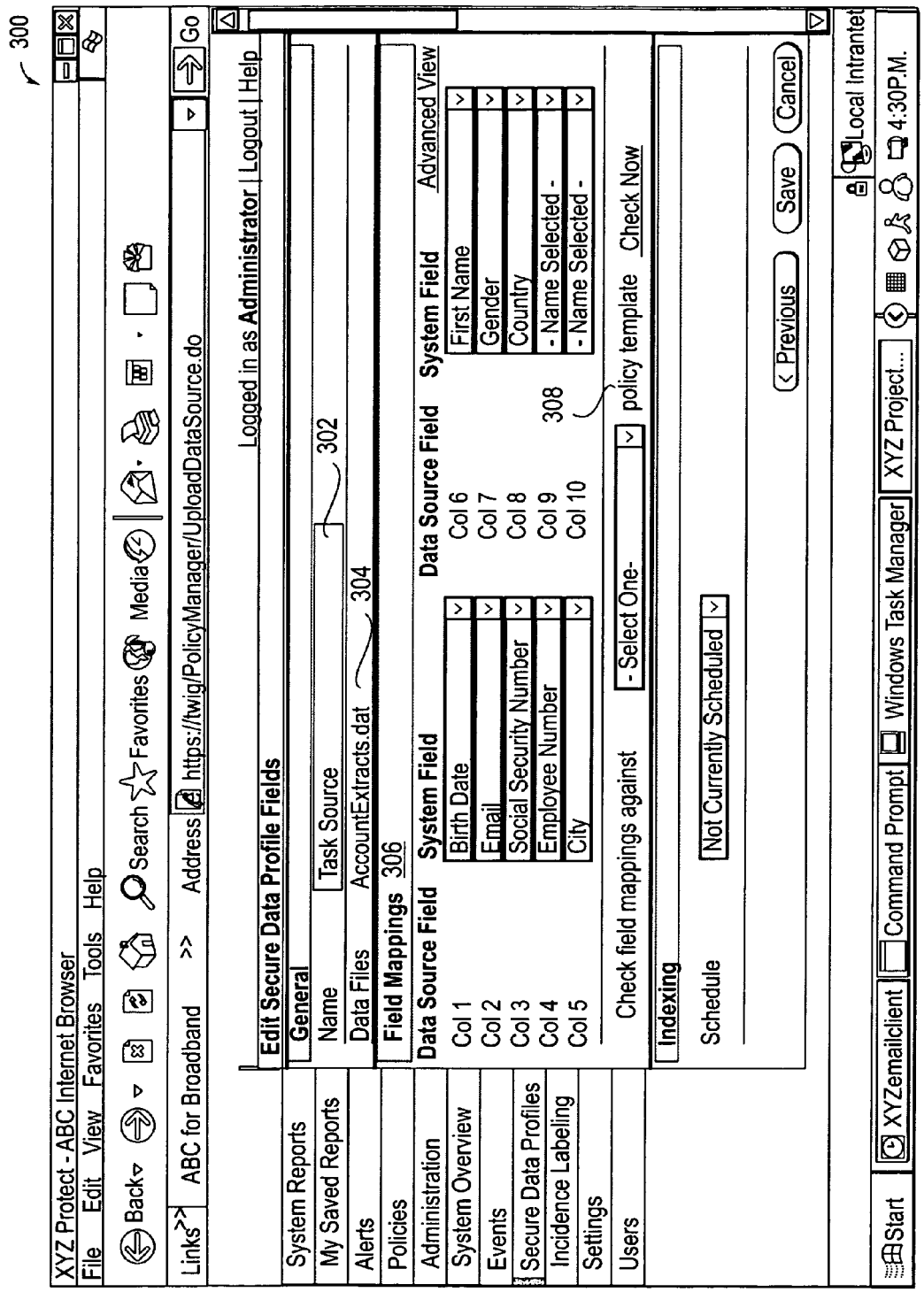

Referring to FIG. 3A, a user interface 300 allows a user to specify the name 302 of the source data and the file name 304 containing the source data. The user interface 300 also allows the user to perform field mapping 306 between data source fields and system column names.

Figure 3B:

Referring to FIG. 3B, a user interface 320 allows a user to provide policy parameters associated with source data 330. Specifically, the user interface 330 allows the user to specify inclusion columns 322, a minimum number of inclusion columns 326, exclusion columns 324, a minimum number of rows(i.e., incident minimum) 328. According to the example illustrated in FIG. 3B, the specified policy parameters require that a match returned by the search include information from at least one random row of the source data 330, that the information from one row contain data from at least two of the checked inclusion columns 322, and that this information exclude data from any of the combined columns 324.

Figure 3C:
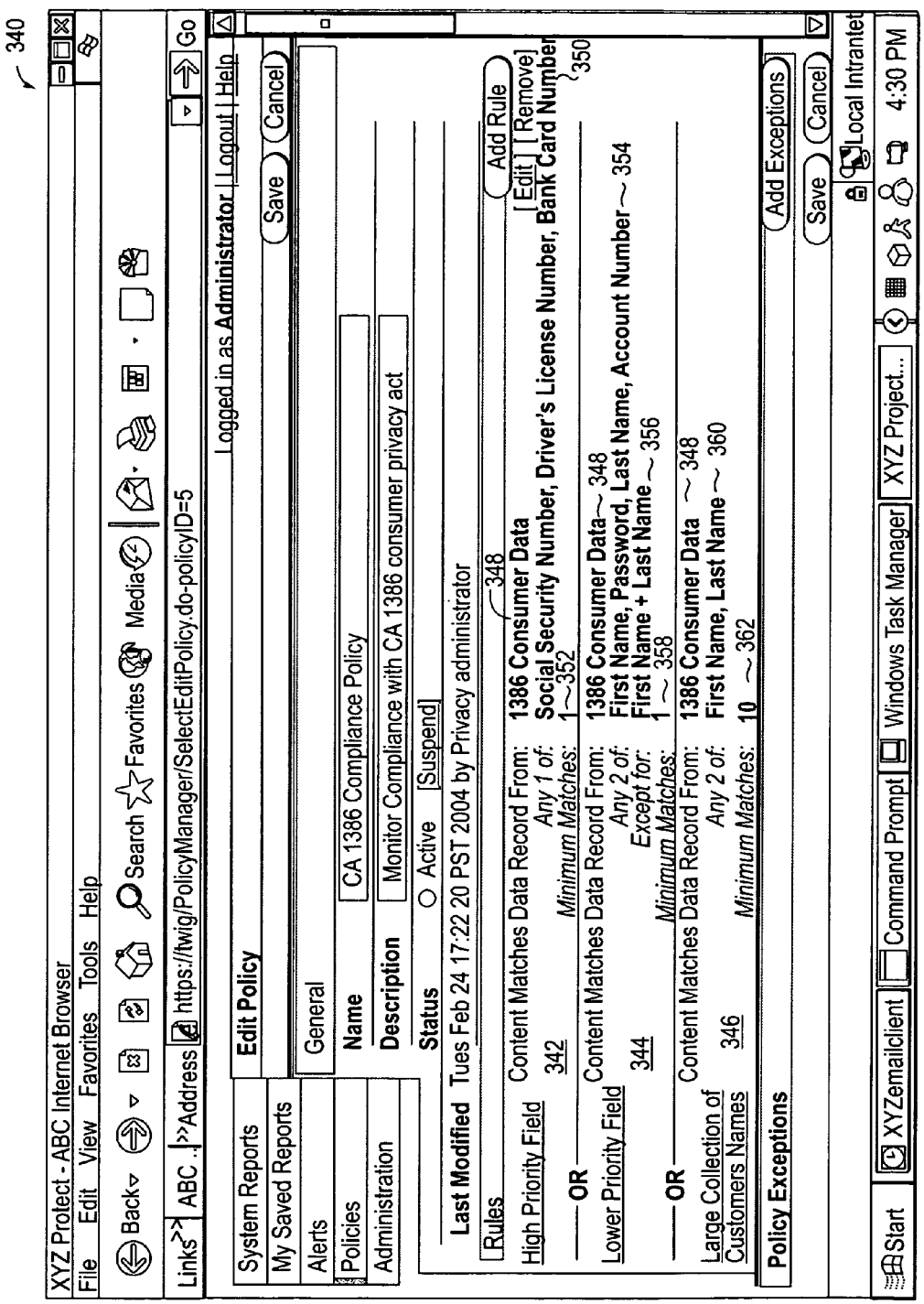

Referring to FIG. 3C, a user interface 340 displays a set of rules contained in the policy associated with source data 348. For a first rule 342, the specified policy parameters require that a match returned by the search include information from at least one row (minimum matches 352) of the source data 348 and that the information from one row contain data from at least one of the three specified columns 350.

For a second rule 344, the specified policy parameters require that a match returned by the search include information from at least one row (minimum matches 358) of the source data 348 and that the information from one row contain data from at least two of four specified columns 354 and exclude matches confined to the fields specified in 356.

For a third rule 346, the specified policy parameters require that a match returned by the search include information from at least 10 possibly non-adjacent rows (minimum matches 362) of the source data 348 and that the information from each of the 10 rows contain data from both columns 360.

Referring to FIG. 3D, a user interface 370 displays rules of the policy associated with source data 372. The first rule requires that the recipient of the violating content match pattern 386. The second rule requires that the content be in an attachment of type 388. The third rule requires that the attachment be less than size 50KB as specified by 390. The fourth rule requires that the match returned by the search include data matching keywords 378. The fifth rule requires that the match returned by the search include data matching keywords 380. The sixth rule requires that the match returned by the search include data matching an expression 382. The seventh rule requires that a match returned by the search include information from at least one row (minimum matches 376) of the source data 372, and that that the information from each row contain data from at least two of specified columns 374.

Exemplary Search Techniques

As discussed above, violations are detected by searching information content using predefined policies. In one embodiment, a search is performed using an abstract data structure (index) derived from source data. In one embodiment, this index contains no copies of the source data, or contains only encrypted or hashed copies of the source data. This embodiment specifically avoids storing any representation of the data itself so that, in the case of a hacker breaking into the host that runs the DMS (which utilizes the index when performing content searches as discussed above), the data that is exposed to theft is inconsequential. The index may be created using a tuple-storage mechanism that provides a data structure for storing multiple tuples associated with fragments of the database data. Examples of the tuple-storage mechanism include a hash table, a vector, an array, a tree, a list, or a table in a relational database management system. In the process described below, the data stored in the indices only retains the relative placement of the elements in the database in relation to other elements. For example, in the case of a hash table, the index may store, for each fragment of the database data (e.g., a data fragment inside a database cell), the fragment's hash code together with its row number, column number and type of the column.

In another embodiment, indices contain fragments of the intellectual property that is under protection, thus reducing the value of the solution by exposing that information to security threats.

In yet another embodiment, copies of a small amount of frequently used strings and numbers from the database that represent a large proportion of the data in the system is still stored directly in the index along with the rest of the information on relative placement of data in the database table(s). This is done by storing copies of these common strings themselves, instead of hash codes. As a result, indices may include the row numbers, column numbers, and type of the source data, but instead of storing a hash code it stores the string itself. For the rest of the cells of the database that are not quite so common, only the row numbers, column numbers, and type of the source data are stored while specifically not storing copies of these strings. This approach uses the fact that the statistical distribution of string and numeric data in databases is often skewed so that the most common terms account for a very large percentage of the overall volume of data stored. Storing these common terms in a separate index helps index query efficiency since the small number of common terms accounts for a large proportion of the queries, and these queries can be run using standard quick techniques from the literature (e.g., hash table lookups, bitmaps, etc.). The reason that this is not a security vulnerability is that this small number of terms that account for a disproportionate share of volume of source data are the least valuable pieces of data. The terms "John" and "Smith" are very common inside databases that contain names, but the theft of these terms is relatively worthless. In this embodiment, the system is still carefully avoiding storing copies of data of less-common terms of higher value (e.g., credit card numbers, SSN, uncommon names, etc.).

Figure 4:
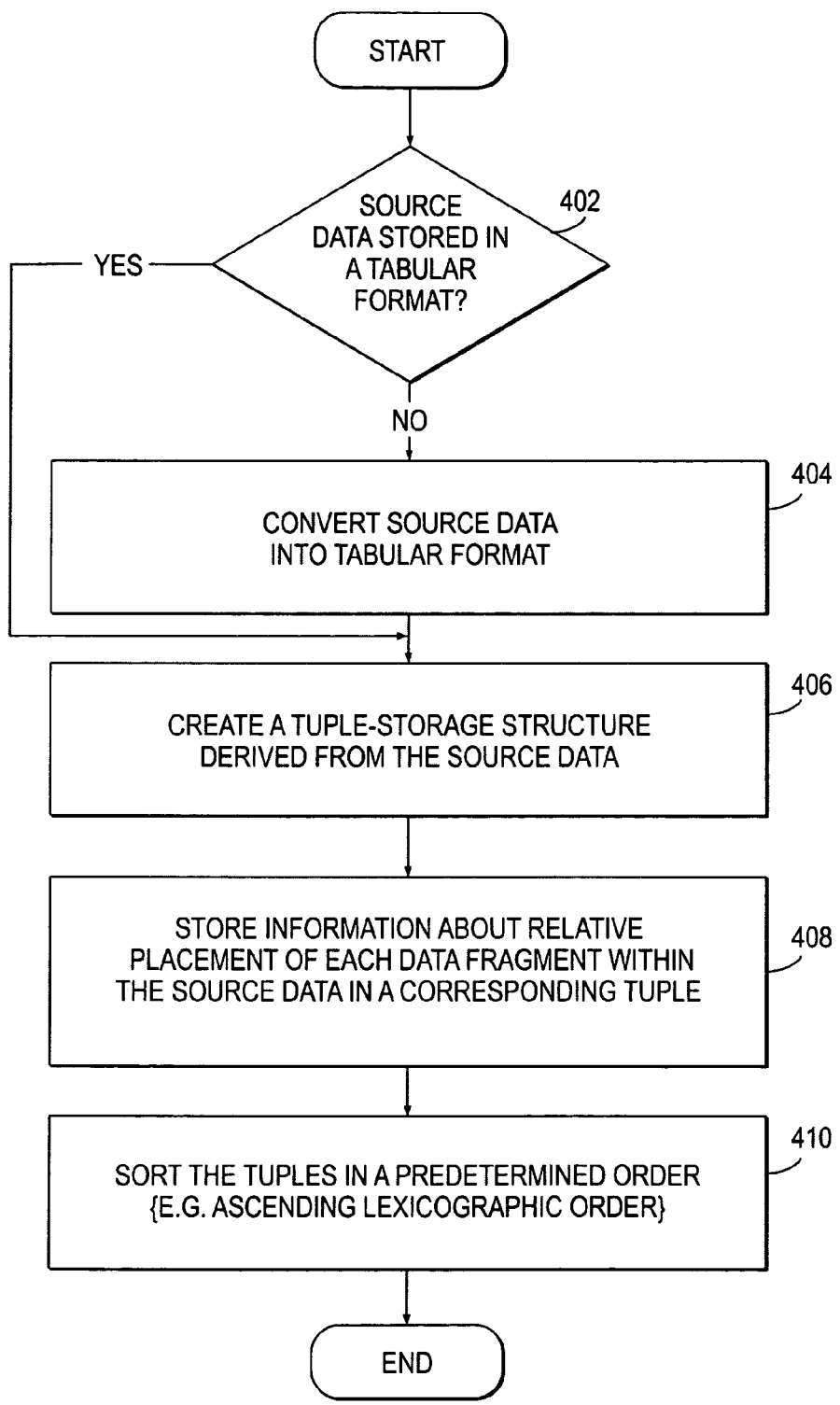
FIG. 4 is a flow diagram of one embodiment of a process for indexing source data.

FIG. 4 is a flow diagram of one embodiment of a process for indexing the source data. The process is performed by processing logic that may comprise hardware (circuitry, dedicated logic, etc.), software (such as is run on a general purpose computer system or a dedicated machine), or a combination of both.

Referring to FIG. 4, processing logic begins with determining whether the source data is stored in a standard tabular format (processing box 402). If not, processing logic converts the source data into a standard tabular format (processing block 404). Each cell in the resulting table stores a fragment of the source data. In one embodiment, each data fragment is a token. A token may be a single word or a cluster of words (e.g., words enclosed in quotation marks). For example, while the word "this" may represent a token stored in a database cell, the phrase "this token" may also represent a standalone token if it is stored as a single string in a database cell.

Next, processing logic creates a tuple-storage structure derived from the source data (processing block 406). A tuple-storage structure provides a mechanism for storing multiple tuples associated with the fragments of the source data. Examples of tuple-storage structures include a hash table, a vector, an array, a tree or a list. Each type of the tuple-storage structure is associated with a method for retrieving a set of tuples for any given content fragment (the set of tuples may be empty if no match is found in the tuple-storage structure).

Further, processing logic stores information about the position of each data fragment within the source data in a corresponding tuple (processing block 408). In one embodiment, the information about the position of a data fragment includes the number of a row storing the data fragment in the source data. In another embodiment, this information also includes the number of a column storing the data fragment in the source data and optionally the data type of the column.

Afterwards, processing logic sorts the tuples in a predetermined order (e.g., in the ascending lexicographic order) (processing block 410).

Thus, the resulting abstract data structure (i.e., the index) only contains information about the relative placement of data records in the context of the larger whole but does not include any fragments of the source data itself.

In one embodiment, the contents of the index are treated cryptographically (e.g., with a hash function or using an encryption function with a cryptographic key) to further secure the index from theft.

Figure 5:
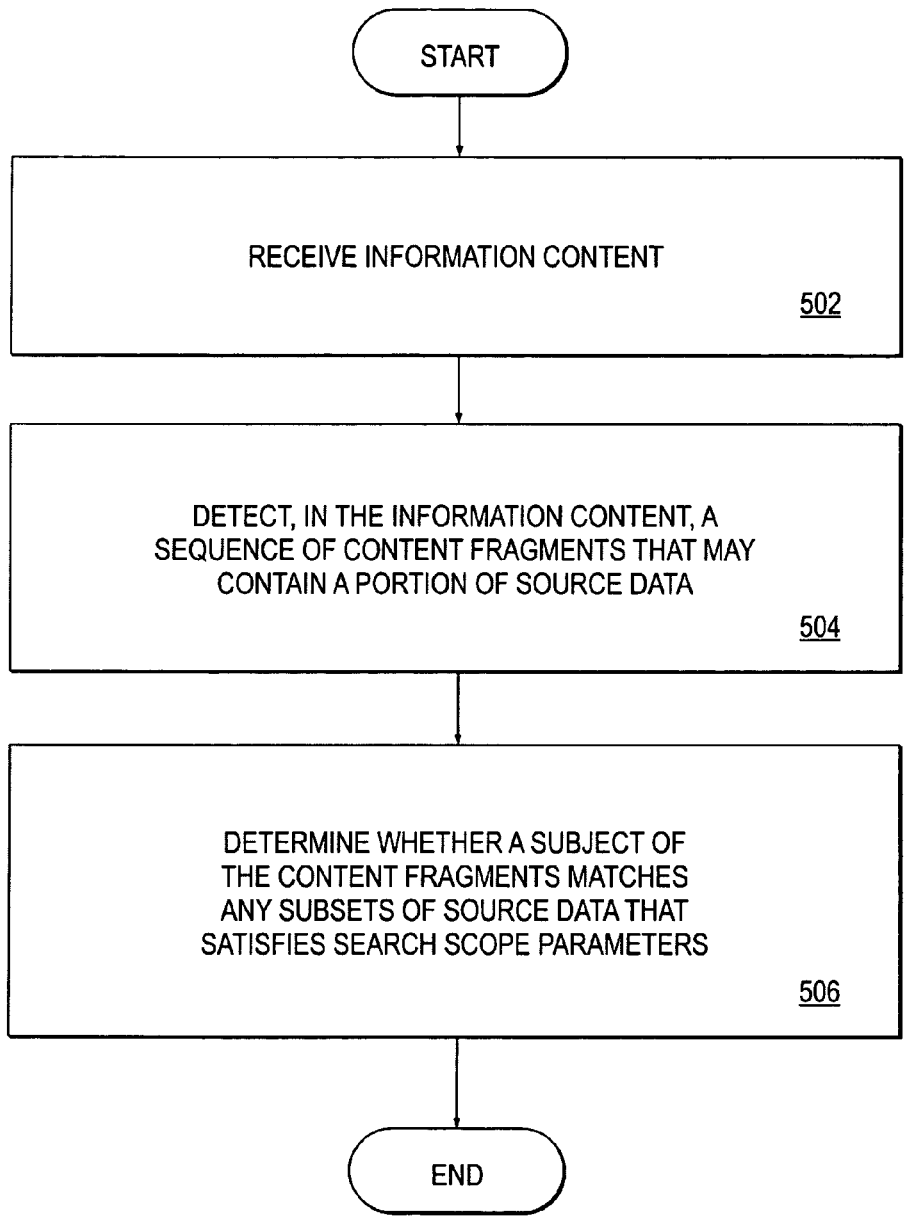
FIG. 5 is a flow diagram of one embodiment of a process for searching information content for source data.

Exemplary search techniques will now be described in more detail. FIG. 5 is a flow diagram of one embodiment of a process for searching information content for source data. The process is performed by processing logic that may comprise hardware (circuitry, dedicated logic, etc.), software (such as is run on a general purpose computer system or a dedicated machine), or a combination of both.

Referring to FIG. 5, processing logic begins with identifying information content (processing block 502). The information content includes free-from text and may be included in a file (e.g., an archived email message stored on a hard drive of a computer) or in a block of data transmitted over a network (e.g., an email message transmitted over a network using any type of a network protocol). As discussed above the information content to be searched may be selected based on theft detection conditions specified by the user.

Next, processing logic detects in the information content a sequence of content fragments that may possibly contain a portion of source data (processing block 504). The detected sequence of content fragments may be a set of adjacent or non-adjacent tokens within the information content. Each token may correspond to either a word or a phrase. The detected sequence of content fragments may be a portion of the received information content or the entire information content. In another embodiment, the detected sequence of content fragments is considered as a set of subsets of tokens, in which each subset of tokens may possible contain a portion of source data.

In one embodiment, processing logic decides that a sequence of content fragments may possibly contain a portion of the source data upon determining that the sequence of content fragments resembles column-formatted data. This determination may be made by parsing the received information content to identify separated lines (as may be indicated, for example, by tags <cr> or <cr><lf>) and finding that these separated lines contain a similar number of tokens and optionally the similar data types of the tokens.

In another embodiment, processing logic decides that a sequence of content fragments may possibly contain a portion of the source data upon parsing the entire information content and searching blocks of contiguous tokens for source data. In one embodiment, the blocks of contiguous tokens are defined based on user-specified parameters such as a user-specified width of each block and a user-specified position of each block within the information content (e.g., the user may require that the two adjacent blocks be separated by a certain number of tokens).

In yet another embodiment, processing logic decides that a sequence of content fragments may possibly contain a portion of the source data upon finding in the information content an expression of a predefined format. Such expression may be, for example, an account number, a social security number, a credit card number, a phone number, a postal code, an email address, text formatting indicating a monetary or numeric value (e.g., "$" signs together with digits), etc. Once the expression is found, processing logic decides that a region of text surrounding the expression may possibly contain a portion of the source data. The size of this region may be defined by a predetermined number of tokens on each side of the found expression.

In yet another embodiment, processing logic decides that a sequence of content fragments may possibly contain a portion of the source data upon determining that the word usage or the word distribution in the information content (or in some portion of the information content) resembles a statistical pattern that indicates a possible containment of the source data in the information content.

In still another embodiment, processing logic decides that a sequence of content fragments may possibly contain a portion of the source data upon determining that certain properties associated with the received information content indicate a possible containment of the source data in the information content based on the history of previous violations. These properties may include, for example, the destination of the information content (e.g., a recipient of an electronic message), the origin of the information content, the time of transmission associated with the information content, the size of transmission associated with the information content, the types of files contained in the transmission (e.g., multipurpose Internet mail extension (MIME) types of files), etc. In one embodiment, the history of previous violations is maintained by identifying, for each detection of source data, the properties of the information content in which the source data was detected and recording these properties in a previous violation database. Subsequently, when processing logic decides whether a sequence of content fragments within the new information content may possibly contain a portion of source data, processing logic identifies the properties of the new information content and searches the previous violation database for these properties. If a match is found, processing logic determines whether the previous violations associated with the matching property indicate a possible containment of source data in the new information content. This indication may be based on the number of previous violations associated with the matching property or the frequency of previous violations associated with the matching property. For example, this indication may be based upon the total number of violations that a particular sender has committed, or the frequency of those violations over a given time period.

Afterwards, upon detecting a sequence of content fragments that may possibly contain a portion of the source data, processing logic makes a determination as to whether any subset of these content fragments matches a subset of the source data and is in accordance with the policy parameters discussed above (processing block 506).

Figure 6A:
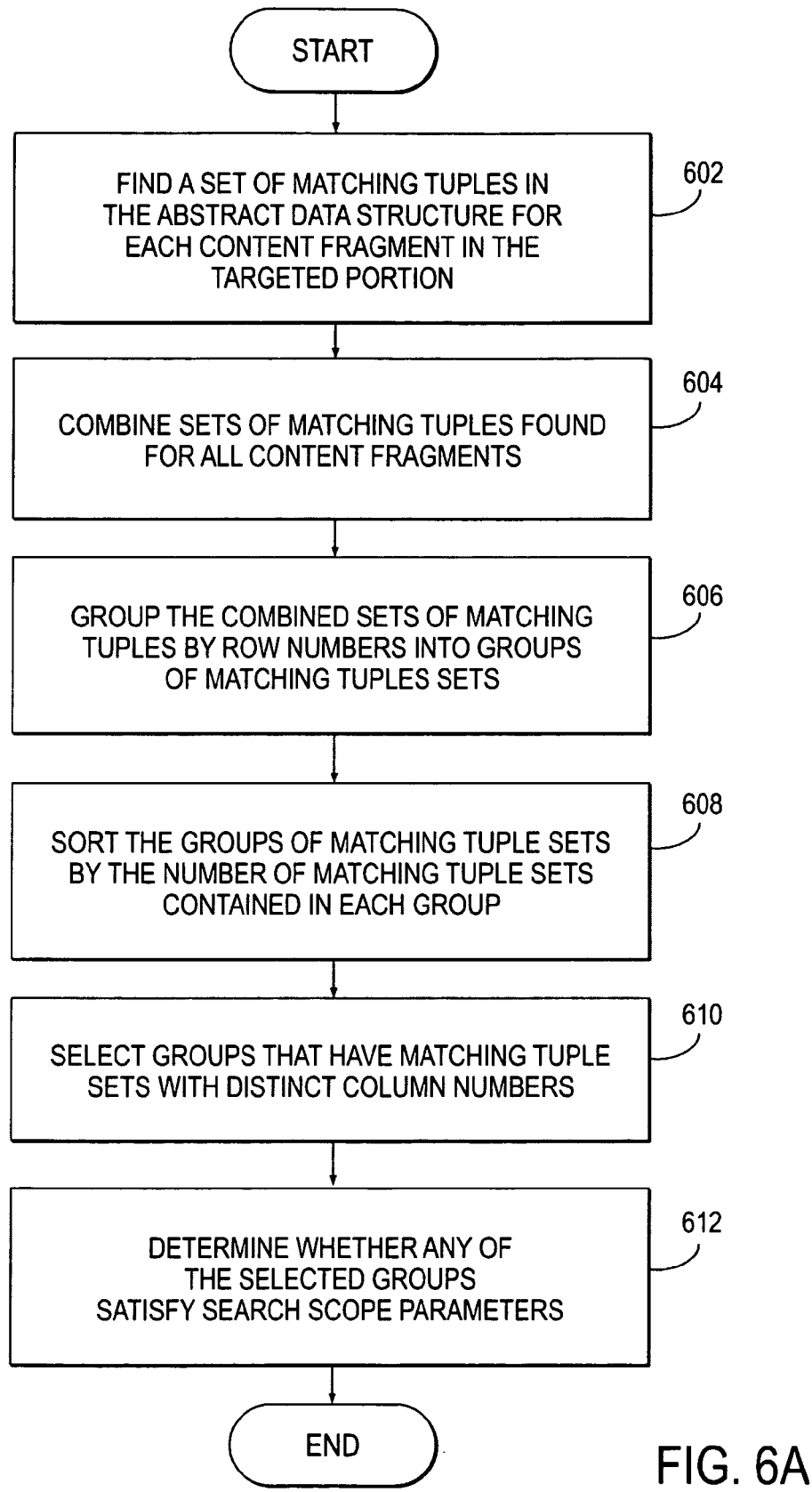
Figure 6C:
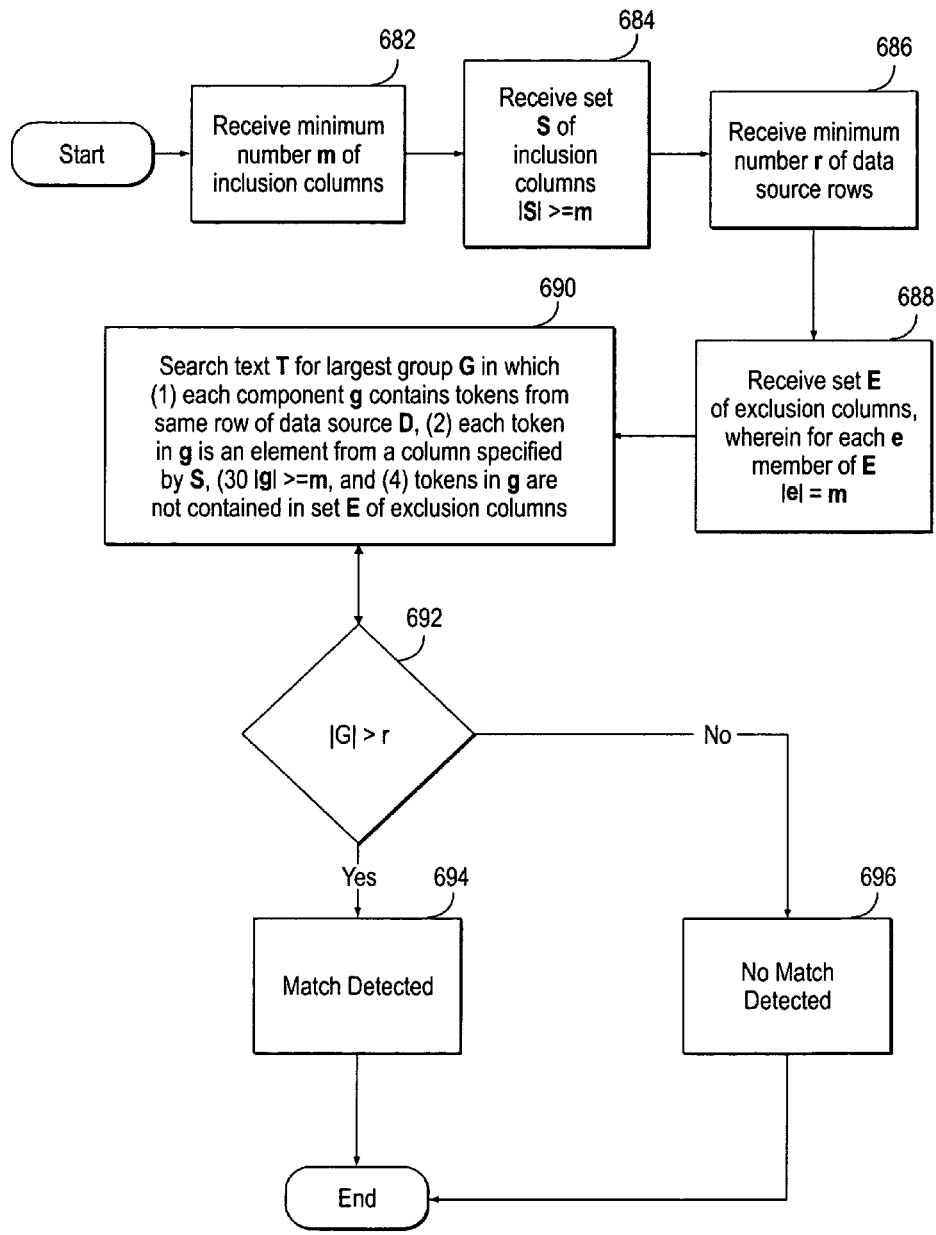

FIGS. 6A-6C are flow diagrams of various exemplary embodiments of a process to find, for a subset of content fragments, a match satisfying policy parameters in an abstract data structure derived from source data. The process is performed by processing logic that may comprise hardware (circuitry, dedicated logic, etc.), software (such as is run on a general purpose computer system or a dedicated machine), or a combination of both.

Referring to FIG. 6A, processing logic begins with parsing the sequence of content fragments identified at processing block 504 of FIG. 5 into content fragments (e.g., tokens). Then, for each content fragment, processing logic searches the abstract data structure for a set of matching tuples (processing block 602). For example, a word "Smith" contained in the information content may have several occurrences in the source data that are reflected in the abstract data structure. Specifically, each of these occurrences has a corresponding tuple in the abstract data structure. During the search, processing logic retrieves a set of tuples corresponding to the occurrences of the word "Smith" in the source data. Each tuple stores information about the position of this data fragment within a database or a table storing the source data. In one embodiment, the positional information includes the row number of a cell storing the data fragment. In another embodiment, the positional information also includes a column number of this cell and optionally the data type of the column.

Next, processing logic combines the matching tuple sets found for all the content fragments (processing block 604) and then groups the combined matching tuple sets by row numbers into groups L (processing block 606). As a result, each group L (referred to herein as an accumulator) contains matching tuple sets that all have the same column number, i.e., the matching tuple sets in each group L correspond to fragments of the source data that all appear to be from the same row in the database.

Further, processing logic sorts the groups L by the number of matching tuple sets contained in each group (processing block 608) and, in one embodiment, selects those groups that have tuple sets with distinct column numbers (processing block 610). Afterwards, processing logic determines whether any of the selected groups satisfy policy parameters (processing block 612).

FIG. 6B illustrates one exemplary embodiment of a process for determining whether any selected groups of tuple sets satisfy policy parameters.

Referring to FIG. 6B, processing logic begins with determining whether the policy parameters specify inclusion columns (decision box 652). If not, processing logic proceeds to decision box 664. If so, processing logic determines whether the policy parameters specify a minimum number M of inclusion columns (decision box 654). If number M is specified, processing logic searches for groups with tuples from at least M number of the inclusion columns (processing block 660) and determines whether any such groups are found (i.e., the number of found groups is greater than 0) (decision box 662). If the determination made at decision box 662 is positive, processing logic proceeds to decision box 664. If the determination made at decision box 662 is negative, processing logic decides that no violation has been detected (processing block 680).

If number M is not specified (decision box 654), processing logic searches for groups with tuples from each specified inclusion column (processing block 656) and determines whether any such groups are found (decision box 658). If the determination made at decision box 658 is positive, processing logic proceeds to decision box 664. If the determination made at decision box 658 is negative, processing logic decides that no violation has been detected (processing block 680).

At decision box 664, processing logic determines whether the policy parameters specify any key words or expressions. If not, processing logic proceeds to decision box 670. If so, processing logic searches for groups with tuples matching the specified keywords or expressions (processing block 666) and determines whether any such groups are found (decision box 668). If the determination made at decision box 668 is positive, processing logic proceeds to decision box 670. If the determination made at decision box 668 is negative, processing logic decides that no violation has been detected (processing block 680).

At decision box 670, processing logic determines whether the policy parameters specify exclusion columns. If not, processing logic proceeds to decision box 676. If so, processing logic searches for groups with tuples that are not from all of the exclusion columns (processing block 672) and determines whether any such groups are found (decision box 674). If the determination made at decision box 672 is positive, processing logic proceeds to decision box 676. If the determination made at decision box 672 is negative, processing logic decides that no violation has been detected (processing block 680).

At decision box 676, processing logic determines whether the policy parameters specify a minimum number L of rows. If not, processing logic decides that a violation is detected (processing block 682). If so, processing logic determines whether the most recent number of found groups is not less than L (decision box 678). If this determination is positive, processing logic decides that a violation is detected (processing block 682). If the determination made at decision box 678 is negative, processing logic decides that no violation has been detected (processing block 680).

FIG. 6C illustrates an alternative exemplary embodiment of a process for determining whether any selected groups of tuple sets satisfy policy parameters.

Referring to FIG. 6C, processing logic begins with receiving parameter m that identifies the minimum number of inclusion columns (i.e., data source columns whose data needs to be included in the search result) (processing block 682).

Next, processing logic receives parameter S specifying the set of inclusion columns and confirms that |S| is greater or equal to m (processing block 684).

At processing block 686, processing logic receives parameter r specifying the minimum number of rows. Parameter r requires that the search result contain data from at least r rows of the source data.

At processing block 688, processing logic receives parameter E specifying a set of exclusion columns (i.e., data source columns whose data has to be excluded from the search result) and confirms that for each e member if E, |e| is equal to m.

At processing block 690, processing logic searches text T for the largest match group G in which:
(a) each components is a subset g of text T that contains tokens from the same row of data source D,
(b) each token from g is an element from a column in D specified by S,
(c) |g|>=m, and
(d) tokens of g do not contain data from exclusion columns E.

At decision box 692, processing logic determines whether |G| is greater than r. If so, processing logic decides that a match is detected (processing block 694). If not, processing logic decides that no match is detected (processing block 696).

Figure 7A:
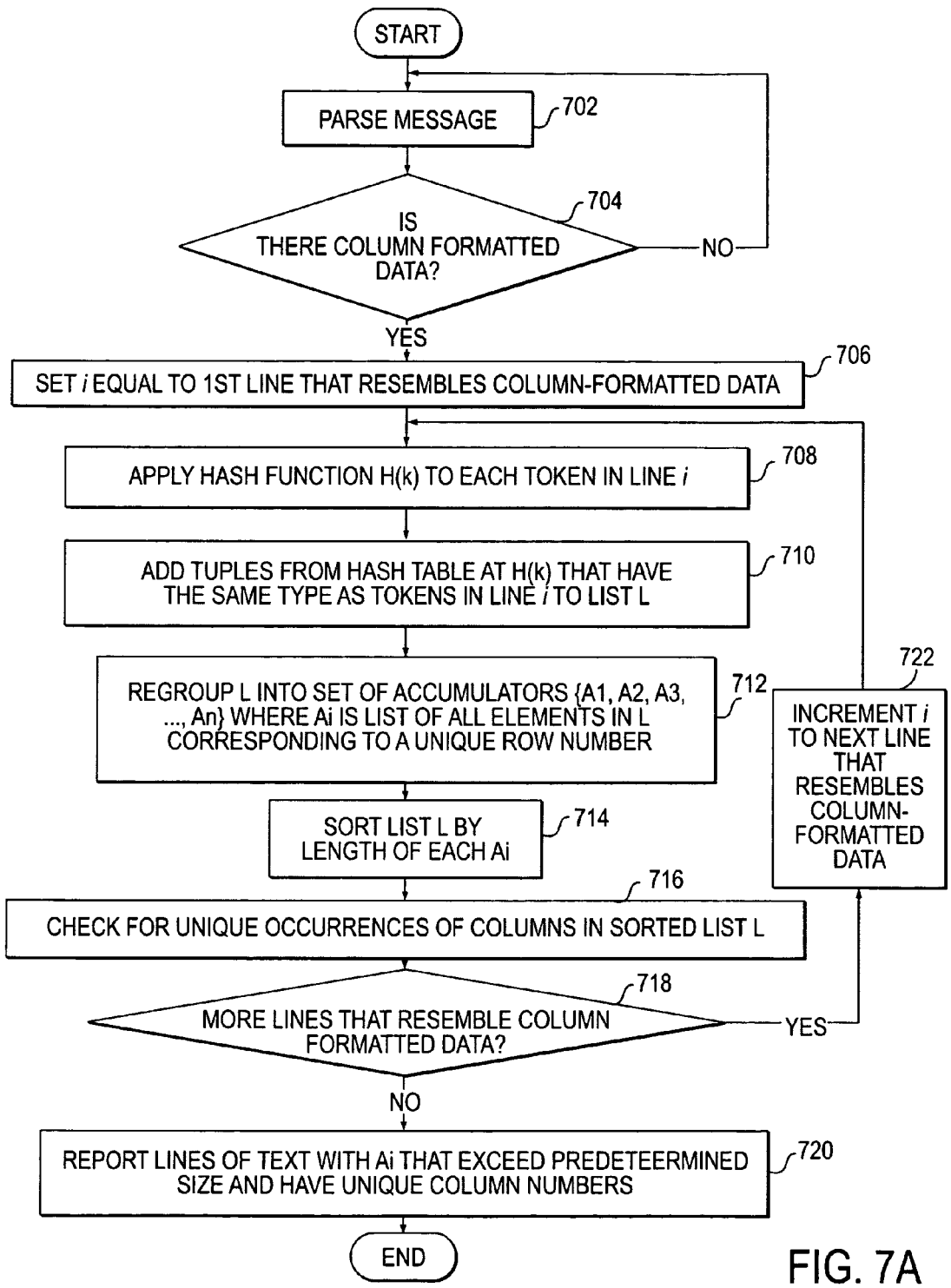
FIGS. 7A-7C are flow diagrams of alternate embodiments of a process for searching an incoming message using a hash table index of source data.
Figure 7B:
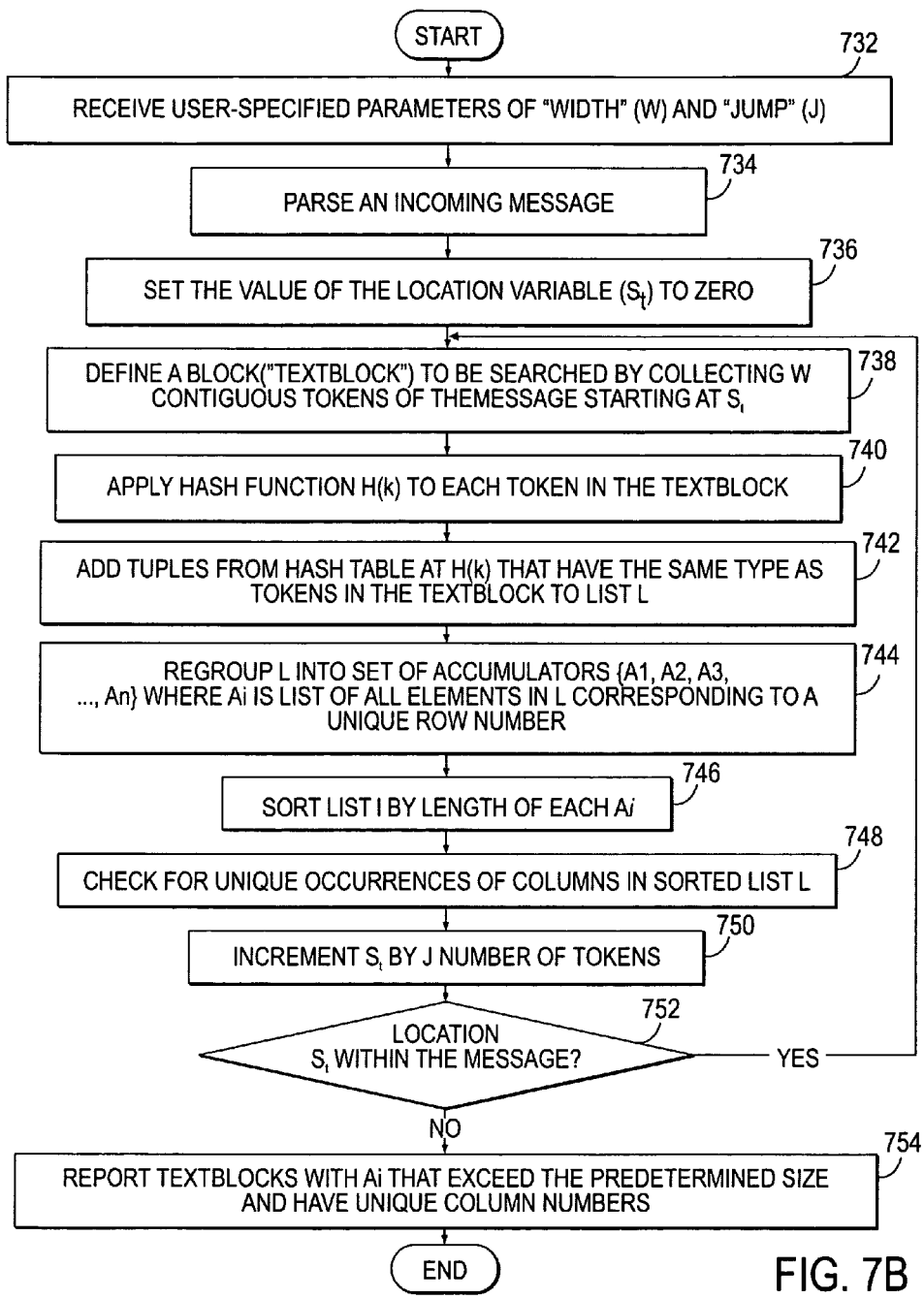
Figure 7C:
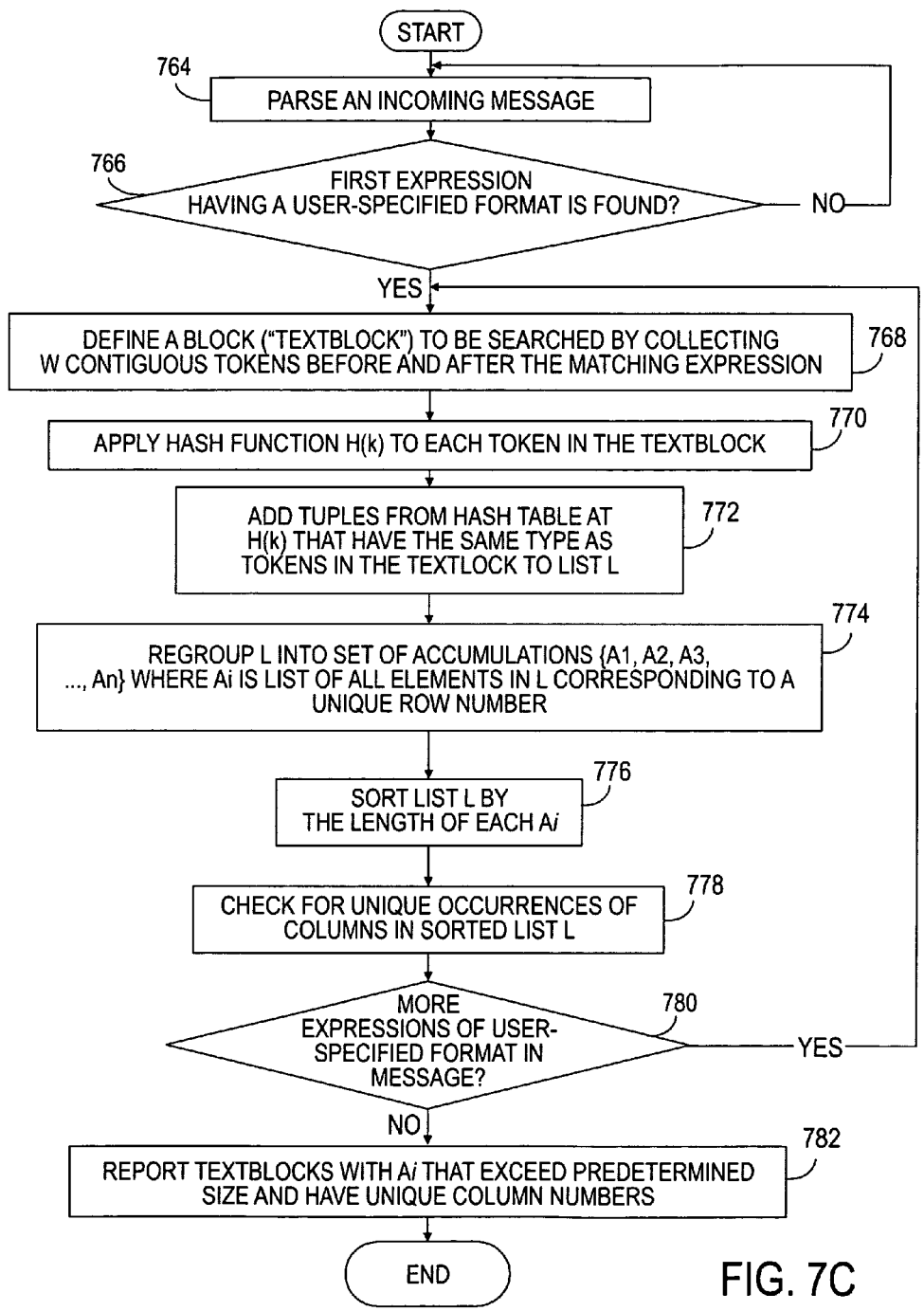

Exemplary embodiments of a search process will now be described. FIGS. 7A–7C are flow diagrams of alternate embodiments of a process for searching an incoming message using a hash table index of source data. The process is performed by processing logic that may comprise hardware (circuitry, dedicated logic, etc.), software (such as is run on a general purpose computer system or a dedicated machine), or a combination of both.

Referring to FIG. 7A, processing logic begins with parsing an incoming message (processing block 702). Next, processing logic determines whether the parsed portions of the incoming message contain column-formatted data (processing box 704). In one embodiment, lexical analysis may be used to identify lines in the parsed portions of the incoming message (e.g., by finding tags <cr> or <cr><lf> that are used to separate lines) and then detecting that the number of tokens found in adjacent lines is identical in number and in type. In one embodiment, processing logic stores the type of each token, along with the total number of tokens.

If the determination made at processing box 704 is negative, processing transitions to processing block 702. Otherwise, processing transitions to processing block 706 where processing logic sets i equal to the first line that resembles column-formatted data.

Next, processing logic applies a hash function H(k) to each token in line i (processing block 708), finds a set of tuples at H(k) in the hash table for each token in line i, adds the tuples to list L, and regroups list L into a set of accumulators (processing block 712) in which each individual accumulator's tuples have the same row number value. Further, processing logic sorts that list L by the length of each Ai (processing block 714) and checks for unique occurrences of columns in sorted list L (processing block 716). At processing block 710, optional pre-processing logic may be performed to filter the tokens before insertion into list L so that only those tuples with type matching the lexical type of the original token k are added to L. It should be noted that in some other embodiments checking for unique occurrences of columns may be skipped for reasons of speed or simplicity. In yet other embodiments, tuples are simple "singletons" containing row numbers only (i.e., no column number and no type indicator).

Afterwards, if the incoming message contains more lines that resemble column-formatted data (processing box 718), processing logic increments i to the next line that resembles column-formatted data (processing block 722) and the process transitions to processing block 706. Otherwise, processing logic reports lines of text with Ai that exceed the predetermined size and have unique column numbers (processing block 720).

Referring to FIG. 7B, processing logic begins with receiving user-specified parameters of "width" (W) and "jump" (J) (processing block 732) and parsing an incoming message (processing block 734). Parameter W specifies the number of contiguous tokens in each block of contiguous tokens that is to be searched during a single iteration and parameter J specifies the required number of tokens between the two adjacent blocks.

Next, processing logic sets the value of the location variable ($S_t$) to zero (processing block 736) and defines a block ("textblock") to be searched by collecting W contiguous tokens of the message starting at St (processing block 738).

Further, processing logic applies a hash function H(k) to each token in the textblock (processing block 740), finds a set of tuples at H(k) in the hash table for each token in the textblock, adds the tuples that have the same type as the corresponding tokens in the textblock to list L (processing block 742), regroups list L into a set of accumulators (processing block 744), sorts that list L by the length of each Ai (processing block 746) and checks for unique occurrences of columns in sorted list L (processing block 748).

Afterwards, processing logic increments $S_t$ by J number of tokens (processing block 750) and determines whether location $S_t$ is still within the message (processing box 752). If the determination is positive, the process transitions to processing block 738. Otherwise, processing logic reports textblocks with Ai that exceed the predetermined size and have unique column numbers (processing block 758).

Referring to FIG. 7C, processing logic begins with parsing an incoming message (processing block 764) and looking for a first expression having a user-specified format (processing block 766). Such expression may be, for example, an account number, a social security number, a credit card number, text formatting indicating a monetary or numeric value (e.g., "$" signs together with digits), etc. If the matching expression is not found, the process transitions to processing block 764. Otherwise, the process transitions to processing block 768 where processing logic defines a block ("textblock") to be searched by collecting W contiguous tokens before and after the matching expression. For example, the textblock may consist of 10 tokens immediately preceding the matching expression, the matching expression itself and 10 tokens immediately following the matching expression.

Further, processing logic applies a hash function H(k) to each token in the textblock (processing block 770), finds a set of tuples at H(k) in the hash table for each token in the textblock, adds the tuples that have the same type as the corresponding tokens in the textblock to list L (processing block 772), regroups list L into a set of accumulators (processing block 774), sorts that list L by the length of each Ai (processing block 776) and checks for unique occurrences of columns in sorted list L (processing block 778).

Afterwards, processing logic determines whether the message has anymore expressions of the user-specified format (processing box 780). If this determination is positive, the process transitions to processing block 768. Otherwise, processing logic reports textblocks with Ai that exceed the predetermined size and have unique column numbers (processing block 782).

Comparison with the Prior Art

Database query mechanisms are significantly different from the teachings described herein. One difference is that B-trees actually contain fragments of the database tables that they index. In the approach described above, there are no copies of the database data stored inside the index. The reason that this is important is that—as mentioned above—the DMS has to have a copy of the index in order to protect the data from escape; however the DMS is also best deployed in a position in the network where it may be exposed to significant threats. Keeping the index that the DMS uses free of any components of the database data is a key requirement.

Another difference between standard database query mechanisms and the invention outlined here has to do with the types of queries that are required. The standard set of queries used in relational databases is based on predicate logic using connectives like AND and OR. This basic system does not work well for detection of database data that is typically cut-and-paste into email and webmail messages. Database data that is cut-and-paste into email messages is typically from reports and will often contain data in each line that is extraneous and not found inside the database table. An example could be an email message that contains, for example, account information for a bunch of customers. Such a message will contain plenty of records from the core database that requires protection, e.g., first name, last name, social-security number, etc., but could also contain information not in the core database tables. A typical example is information that is "joined" from other databases. Another example is simple line formatting tokens that separate fields of database data. Because of the possibility of this extra data that's typically found on each of these lines, the standard predicate logic connectives like AND and OR applied to each token on the line of an outgoing message produce either too many hits (as is the case with OR) or zero hits (as is the case with AND). In the description herein, the system is able to detect the presence of n or more tokens that are all from the same row of a database table, even in the case where n is much smaller than the total number of tokens in the line. This is another significant difference between the present invention and the prior art mentioned above for database and document query mechanisms.

There are several major differences between the techniques described above and information retrieval technologies. Firstly, the indices for these systems contain (inside the concordances) the same terms that are stored in the database that is to be protected. Here again, since the system deploys this index into a location on the network that is potentially under hacker threat; this is a definite disadvantage. Secondly, these query systems run Boolean queries using the forms of predicate logic like AND and OR. As mentioned above, this approach is at a distinct disadvantage for detecting database records that have been possibly "joined" with extraneous data from other tables.

The technique of file shingling is similar to, but substantially different from the technique described herein. In file shingling, the subject of interest is text data (prose, software, outlines, etc.). In the techniques described here, the focus is on protecting database data. One difference is that database data from a given database table may appear with the row order or column order permuted arbitrarily in the test message. These permutations are the simple result of the query mechanisms typically applied to extract database data. A database query could result in a block of database data that comes in arbitrary column order, and arbitrary row order. For this reason, the basic technique of file shingling will not work if applied to database data. File shingling assumes that the same linear sequence is followed between the protected document and the test document.

There are many important differences between Internet content filtering systems and the teachings described herein. As mentioned above, Internet content filtering systems are based on keyword searches. The novel techniques described above build an abstract data structure from the database data that it seeks to protect. This abstract data structure does not contain fragments of the text it is trying to protect. A keyword filtering system must contain some representation of the text that it is searching for in order to run its queries. The second major difference is that these Internet content filtering systems are not intended to protect database data. Using regular expression matching to detect violations of an organizations privacy policy on database data will also lead to a very inaccurate method of detection. These systems are primarily applied to stop employee abuse of the Internet as it relates to pornographic or abusive content and language. Such systems, if applied to the protection of database data, would use regular expressions to match database records. This would also result in transferring fragments of the database data to the computer on the network where security risks are maximized.

An Exemplary Computer System

Figure 8:
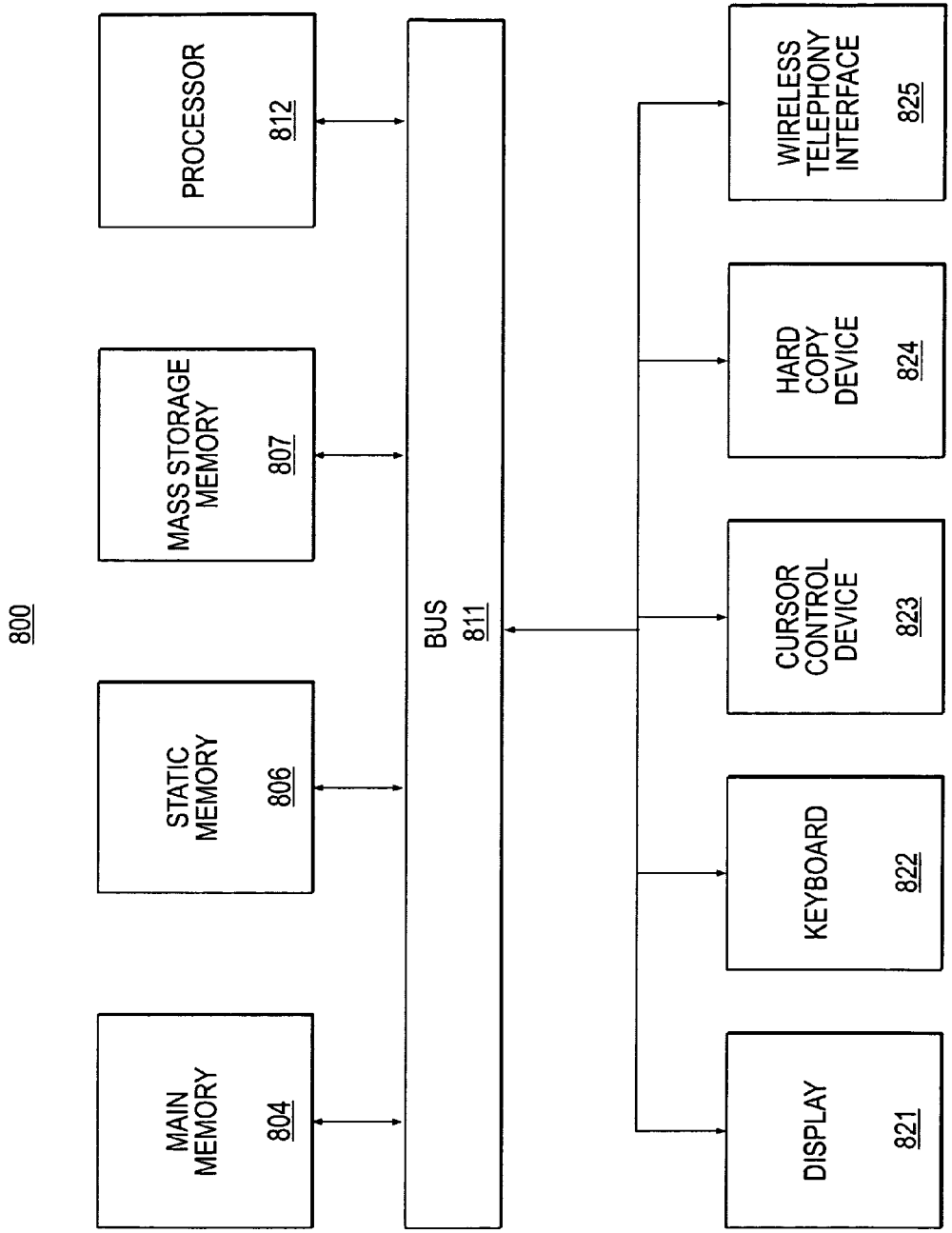
FIG. 8 is a block diagram of an exemplary computer system that may perform one or more of the operations described herein.

FIG. 8 is a block diagram of an exemplary computer system that may perform one or more of the operations described herein. Referring to FIG. 8, computer system 800 may comprise an exemplary client 850 or server 800 computer system. Computer system 800 comprises a communication mechanism or bus 811 for communicating information, and a processor 812 coupled with bus 811 for processing information. Processor 812 includes a microprocessor, but is not limited to a microprocessor, such as, for example, Pentium™, PowerPC™, Alpha™, etc.

System 800 further comprises a random access memory (RAM), or other dynamic storage device 804 (referred to as main memory) coupled to bus 811 for storing information and instructions to be executed by processor 812. Main memory 804 also may be used for storing temporary variables or other intermediate information during execution of instructions by processor 812.

Computer system 800 also comprises a read only memory (ROM) and/or other static storage device 806 coupled to bus 811 for storing static information and instructions for processor 812, and a data storage device 807, such as a magnetic disk or optical disk and its corresponding disk drive. Data storage device 807 is coupled to bus 811 for storing information and instructions.

Computer system 800 may further be coupled to a display device 821, such as a cathode ray tube (CRT) or liquid crystal display (LCD), coupled to bus 811 for displaying information to a computer user. An alphanumeric input device 822, including alphanumeric and other keys, may also be coupled to bus 811 for communicating information and command selections to processor 812. An additional user input device is cursor control 823, such as a mouse, trackball, trackpad, stylus, or cursor direction keys, coupled to bus 811 for communicating direction information and command selections to processor 812, and for controlling cursor movement on display 821.

Another device that may be coupled to bus 811 is hard copy device 824, which may be used for printing instructions, data, or other information on a medium such as paper, film, or similar types of media. Furthermore, a sound recording and playback device, such as a speaker and/or microphone may optionally be coupled to bus 811 for audio interfacing with computer system 800. Another device that may be coupled to bus 811 is a wired/wireless communication capability 825 to communication to a phone or handheld palm device.

Note that any or all of the components of system 800 and associated hardware may be used in the present invention. However, it can be appreciated that other configurations of the computer system may include some or all of the devices.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A method comprising:
   identifying, by a computer system, one of a plurality of policy templates, wherein each of the plurality of policy templates includes information for creation of one or more policies for preventing use-restricted content from being sent over a network and a plurality of rules specifying conditions that trigger a policy violation;
   identifying, by the computer system, source data having a tabular structure, the source data including a plurality of data elements having the use-restricted content; and
   automatically creating, by the computer system, a first policy based on the identified policy template and the source data, wherein creating the first policy comprises comparing sets of columns specified in the plurality of rules of the policy template to columns of the source data, wherein the first policy is used for preventing presence of the plurality of data elements in a message sent by a user over the network, the plurality of data elements having the use-restricted content and being from the tabular structure of the identified source data, the first policy triggering an action involving the message upon detecting, in the message being sent by the user, information matching the plurality of data elements having the use-restricted content from the tabular structure of the identified source data.

2. The method of claim 1 further comprising:
   receiving data identifying user selection of the one of the plurality of policy templates.

3. The method of claim 1 further comprising:
   receiving data identifying user selection of the source data having the tabular structure.

4. The method of claim 1 wherein each of the plurality of policy templates is defined based on a corresponding regulation and independently of the source data.

5. The method of claim 1 wherein:
   one of the plurality of rules specifies a set of inclusion columns from the source data having a tabular structure; and
   the policy is created to detect in one or more messages information from the set of inclusion columns within any single row of the tabular structure.

6. The method of claim 1 wherein:
   one of the plurality of rules specifies one or more exclusion columns from the source data having a tabular structure; and
   the policy is created to detect in one or more messages information from any single row of the tabular structure, the detected information excluding data from the one or more exclusion columns.

7. The method of claim 5 wherein:
   one of the plurality of rules further specifies a minimum number of inclusion columns from the set; and
   the policy is created to detect in one or more messages information from at least the minimum number of inclusion columns within any single row of the tabular structure.

8. The method of claim 7 wherein using one of the plurality of policy templates to automatically create the policy comprises:
   comparing the set of inclusion columns specified in the one of the plurality of rules with columns of the tabular structure of the source data;
   determining that at least one column from the set is missing from the tabular structure of the source; and
   removing the at least one missing column from the set specified in the one of the plurality of rules.

9. The method of claim 8 further comprising:
   determining that all columns are removed from the set specified in the one of the plurality of rules; and
   removing the one of the plurality of rules from the policy.

10. The method of claim 8 further comprising:
    determining that a number of columns remained in the set is less than the minimum number of inclusion columns that is specified in the one of the plurality of rules; and
    removing the one of the plurality of rules from the policy.

11. The method of claim 8 further comprising:
    determining that a number of columns remained in the set is less than the minimum number of inclusion columns that is specified in the one of the plurality of rules; and
    updating the minimum number of inclusion columns that is specified in the one of the plurality of rules with the number of columns remained in the set.

12. The method of claim 5 wherein:
    the one of the plurality of rules further specifies a minimum number of rows; and
    the policy is created to detect in one or more messages data from the set of inclusion columns within at least the minimum number of rows of the tabular structure.

13. The method of claim 1 wherein:
    one of the plurality of rules specifies an expression pattern; and
    the policy is created to detect the expression pattern in one or more messages.

14. The method of claim 1 wherein:
    one of the plurality of rules specifies one or more keywords; and
    the policy is created to detect in one or more messages the one or more keywords.

15. The method of claim 1 wherein:
    one of the plurality of rules specifies an attachment type; and the policy is created to detect one or more messages containing attachments of the attachment type.

16. The method of claim 1 wherein:
one of the plurality of rules specifies an attachment size; and
the policy is created to detect one or more messages containing attachments with size exceeding the attachment size.

17. The method of claim 1 wherein:
one of the plurality of rules specifies sender identifying information; and
the policy is created to detect one or more messages with senders matching the sender identifying information.

18. The method of claim 1 wherein:
one of the plurality of rules specifies recipient identifying information; and
the policy is created to detect one or more messages with recipients matching the recipient identifying information.

19. The method of claim 1 further comprising:
maintaining the plurality of policy templates in a data store;
receiving a new version of one of the plurality of templates over a network; and
replacing the one of the plurality of templates with the new version.

20. The method of claim 1 wherein the source data includes content of a plurality of sources, content of each of the plurality of sources having a tabular structure.

21. A system comprising:
a memory hosting a template data store to store a plurality of policy templates, wherein each of the plurality of policy templates includes information for creation of one or more policies for preventing use-restricted content from being sent over a network and a plurality of rules specifying conditions that trigger a policy violation; and
a processor coupled to the memory, to cause a policy specifier to identify source data having a tabular structure, the source data including the use-restricted content, and to automatically create a first policy based on the identified policy template and the source data, wherein creating the first policy comprises comparing sets of columns specified in the plurality of rules of the policy template to columns of the source data, wherein the first policy is used for preventing presence of the plurality of data elements in a message sent by a user over the network, the plurality of data elements having the use-restricted content and being from the tabular structure of the identified source data, the first policy triggering an action involving the message upon detecting, in the message being sent by the user, information matching the plurality of data elements having the use-restricted content from the tabular structure of the identified source data.

22. The system of claim 21 further comprising:
a user interface to receive data identifying user selection of the one of the plurality of policy templates.

23. The system of claim 21 further comprising:
a user interface to receive data identifying user selection of the source data having the tabular structure.

24. The system of claim 21 wherein each of the plurality of policy templates is defined based on a corresponding regulation and independently of the source data.

25. The system of claim 21 wherein:
one of the plurality of rules specifies a set of inclusion columns from the source data having a tabular structure; and
the policy is created to detect in one or more messages information from the set of inclusion columns within any single row of the tabular structure.

26. The system of claim 21 wherein:
one of the plurality of rules specifies one or more exclusion columns from the source data having a tabular structure; and
the policy is created to detect in one or more messages information from any single row of the tabular structure, the detected information excluding data from the one or more exclusion columns.

27. The system of claim 25 wherein:
the one of the plurality of rules further specifies a minimum number of inclusion columns from the set; and
the policy is created to detect in one or more messages information from at least the minimum number of inclusion columns within any single row of the tabular structure.

28. The system of claim 27 wherein the policy specifier is to create the policy by comparing the set of inclusion columns specified in the one of the plurality of rules with columns of the tabular structure of the source data, determining that at least one column from the set is missing from the tabular structure of the source, and removing the at least one missing column from the set specified in the one of the plurality of rules.

29. The system of claim 28 wherein the policy specifier is further to determine that all columns are removed from the set specified in the one of the plurality of rules, and to remove the one of the plurality of rules from the policy.

30. The system of claim 28 wherein the policy specifier is further to determine that a number of columns remained in the set is less than the minimum number of inclusion columns that is specified in the one of the plurality of rules, and to remove the one of the plurality of rules from the policy.

31. The system of claim 28 wherein the policy specifier is further to determine that a number of columns remained in the set is less than the minimum number of inclusion columns that is specified in the one of the plurality of rules, and to update the minimum number of inclusion columns that is specified in the one of the plurality of rules with the number of columns remained in the set.

32. The system of claim 25 wherein:
the one of the plurality of rules further specifies a minimum number of rows; and
the policy is created to detect in one or more messages data from the set of inclusion columns within at least the minimum number of rows of the tabular structure.

33. The system of claim 21 wherein the policy specifier is further to receive a new version of one of the plurality of templates over a network, and to replace the one of the plurality of templates with the new version.

34. The system of claim 21 wherein the source data includes content of a plurality of sources, content of each of the plurality of sources having a tabular structure.

35. A non-transitory computer readable medium that provides instructions, which when executed on a processor causes the processor to perform a method comprising:
identifying, by a computer system, one of a plurality of policy templates, wherein each of the plurality of policy templates includes information for creation of one or more policies for preventing use-restricted content from being sent over a network and a plurality of rules specifying conditions that trigger a policy violation;
identifying, by the computer system, source data having a tabular structure, the source data including a plurality of data elements having the use-restricted content; and automatically creating, by the computer system, a first policy based on the identified policy template and the source data, wherein creating the first policy comprises comparing sets of columns specified in the plurality of rules of the policy template to columns of the source data, wherein the first policy is used for preventing presence of the plurality of data elements in a message sent by a user over the network, the plurality of data elements having the use-restricted content and being from the tabular structure of the identified source data, the first policy triggering an action involving the message upon detecting, in the message being sent by the user, information matching the plurality of data elements having the use-restricted content from the tabular structure of the identified source data.

* * * * *